(12) United States Patent  
Jacobs et al.

(10) Patent No.: US 8,894,851 B1  
(45) Date of Patent: Nov. 25, 2014

(54) LUBRICANT PURIFICATION SYSTEM

(75) Inventors: William A Jacobs, Lake Worth, FL (US); Brian A Jacobs, Lake Worth, FL (US)

(73) Assignee: Puradyn Filter Technologies, Inc., Boynton Beach, FL (US)

( * ) Notice: Subject to any disclaimer, the term of this patent is extended or adjusted under 35 U.S.C. 154(b) by 685 days.

(21) Appl. No.: 13/216,198

(22) Filed: Aug. 23, 2011

Related U.S. Application Data

(63) Continuation-in-part of application No. 12/111,357, filed on Apr. 29, 2008, now Pat. No. 8,002,973, and a continuation-in-part of application No. 12/184,621, filed on Aug. 1, 2008, now Pat. No. 8,573,407, and a continuation-in-part of application No. 12/732,126, filed on Mar. 25, 2010, now Pat. No. 8,298,419, and a continuation-in-part of application No. 12/796,652, filed on Jun. 8, 2010, now Pat. No. 8,308,941, and a continuation-in-part of application No. 13/108,930, filed on May 16, 2011.

(51) Int. Cl.  
    *F01M 1/10*     (2006.01)  
    *B01D 35/06*     (2006.01)  
    *F01M 11/03*     (2006.01)  
    *B03C 5/02*     (2006.01)

(52) U.S. Cl.  
CPC ............... *B01D 35/06* (2013.01); *F01M 11/03* (2013.01); *B03C 5/02* (2013.01); *F01M 2001/1014* (2013.01); *F01M 2001/1042* (2013.01)  
USPC ...... 210/167.03; 210/223; 210/202; 210/206; 210/209

(58) Field of Classification Search  
None  
See application file for complete search history.

(56) References Cited

U.S. PATENT DOCUMENTS

| | | | |
|---|---|---|---|
| 4,954,263 A * | 9/1990 | Woodhouse | 210/695 |
| 6,210,572 B1 * | 4/2001 | Tulchinskiy | 210/223 |
| 2004/0168959 A1 * | 9/2004 | Cousineau et al. | 210/97 |

* cited by examiner

*Primary Examiner* — Terry Cecil  
(74) *Attorney, Agent, or Firm* — Allen D. Hertz, P.A.; Allen D. Hertz

(57) ABSTRACT

A lubricant reclamation system comprising a reclamation housing providing an exterior shell and an interfacing surface defining a housing interior. One or more conductive reclamation subassemblies are disposed within the housing interior. Each conductive reclamation subassembly comprises a conductive reclamation matrix having a series of conductive reclamation passages passing therethrough. Power is provided to the conductive reclamation matrix to energize the material. The energized material aids in the reclamation process by interacting with ionic characteristics of the fluid, magnetic particulate matter, and the like. An additive delivery subassembly is disposed within the housing interior. The additive delivery subassembly comprises an additive form having a series of additive passages passing therethrough. An additive is embedded within the additive delivery subassembly in a manner enabling dissolution of the additive as the fluid passes through the plurality of additive passages.

19 Claims, 18 Drawing Sheets

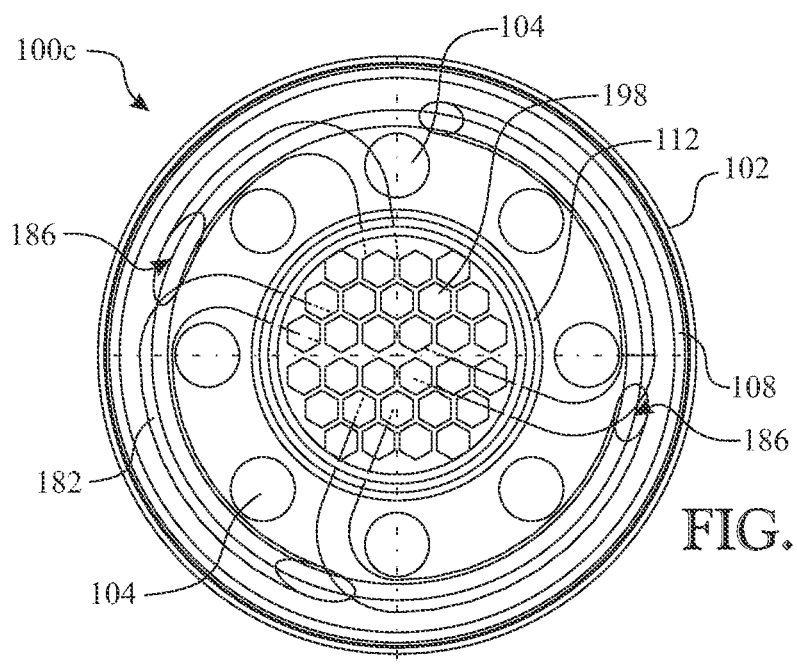
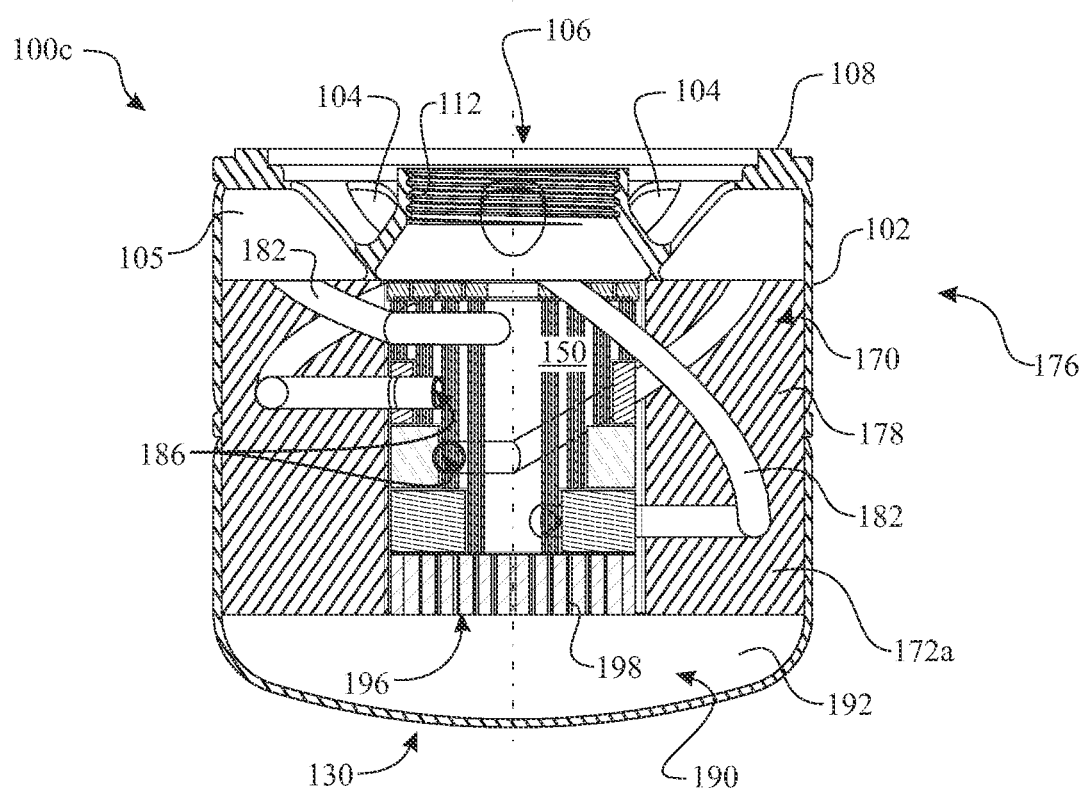
FIG. 12
FIG. 13

LUBRICANT PURIFICATION SYSTEM

CROSS-REFERENCE TO RELATED APPLICATION

This Continuation-In-Part patent application claims the benefit of U.S. Non-Provisional patent application Ser. No. 12/111,357, filed on Apr. 29, 2008, (issuing as U.S. Pat. No. 8,002,973 on Aug. 23, 2011), U.S. Non-Provisional patent application Ser. No. 12/184,621, filed on Aug. 1, 2008 now U.S. Pat. No. 8,573,407, U.S. Non-Provisional patent application Ser. No. 12/732,126, filed on Mar. 25, 2010 now U.S. Pat. No. 8,298,419, U.S. Non-Provisional patent application Ser. No. 12/796,652, filed on Jun. 8, 2010 now U.S. Pat. No. 8,308,941, and co-pending U.S. Non-Provisional patent application Ser. No. 13/108,930, filed on May 16, 2011, all of which are incorporated herein in their entireties.

BACKGROUND OF THE INVENTION

1. Field of the Invention

The present invention relates to an oil reclamation system and more specifically to an oil purification system incorporating a three-section reclamation configuration, an additive reclamation assembly, and series of stacking purification members.

2. Discussion of the Related Art

This invention relates to fluid reclamation and purification devices, which are preferably used in conjunction with engines using lubricating oils or hydraulic systems. More particularly, the present invention provides several unique oil/lubricant treatment means creating a unique system for reconditioning.

Oil reclamation devices are known to incorporate an evaporator head having a heat-transmitting member mounted within a cavity. The heat-transmitting device can incorporate baffles to form a baffled evaporator chamber.

Oil filters are provided in a variety of form factors and materials. Common filters comprise a filtering medium disposed within a canister and sealed via a top member. A mechanical interface, such as a threaded interface, and fluid transfer means, such as an oil inlet and an oil outlet, are integrated into the top member. The filtering materials can be a paper product, a synthetic filtering material, and the like.

Oil reclamation devices can additionally include soluble oil additives for enriching the oil over a period of time. The additives are positioned within the filter in a section between the particle filtering material and a felt pad. The additives are placed to contact the oil and formulated to dissolve over a period of time.

Thus, what is desired is a lubrication reclamation system providing optimal control of the purification process. Additionally, designed is the ability for the end user to tailor the configuration for both purification and monitoring via a plurality of stacked array members.

SUMMARY OF THE INVENTION

The present invention is directed to a lubricant reclamation system comprising a plurality of stackable conditioning members in linear fluid communication with each adjacent member and at least one filtering component.

In a first aspect of the present invention, a filter comprising a filter housing having a mounting feature, an oil inlet conduit, an oil exit conduit, a centralized core filter section, a peripheral filter section, a base section filter, and a plurality of peripheral fluid conduits located in fluid communication between said peripheral core filter and centralized core filter sections.

While another aspect of the present invention provides a fluid reclamation pathway from said peripheral filter section to said base section filter to said centralized core filter section.

Yet another aspect introduces various geometric options for said peripheral fluid conduits, including:
a. Vertically disposed between an oil inlet surface and a base section filter;
b. Vertically disposed from an oil inlet surface projecting towards said base section filter;
c. Tapering;
d. A substantially vertical pathway redirected to a substantially;
e. Horizontal pathway;
f. Spiraling; and
g. Disposed between said oil inlet surface and any of a variety of differing lubricant filtration members disposed within and circumferentially about said centralized core filter section.

Wherein another aspect incorporates a filtering medium disposed within said peripheral fluid conduits.

Another aspect of the present invention provides stackable conditioning members as interlocking rings, each in fluid communication with the adjacent ring.

In another aspect of the present invention, wherein at least one interlocking ring introduces a fluid purification process to the lubricant as the lubricant passes through said interlocking ring.

While another aspect of the present invention provides at least one interlocking ring comprising a monitoring device which gathers at least one measure of a state of the lubricate as the lubricate passes through said interlocking ring.

And in yet another aspect, the at least one interlocking ring includes an interface or adapter for removable engagement with an Original Equipment Manufacturer (OEM) bracket.

Yet another aspect provides a filter comprising a filtering core section having a first filtering configuration, and a filtering peripheral section comprising a second filtering configuration.

With yet another aspect incorporating a sludge filter section located at a distal end from the oil filter oil inlet and mounting face.

And another aspect provides a wall of the peripheral conduits having electrically conductive properties being in electrical communication with the electrical interface of the electrically driven processing array member.

While another aspect incorporates a plurality of core filter material laminates are a three-ply design causing liquid resonance.

Yet another aspect fabricates the three-ply design having an outermost permeable laminate, a central permeable laminate, and an innermost permeable laminate.

With another aspect providing an electrical current through at least one of the outermost permeable laminate, the central permeable laminate, and an innermost permeable laminate, the electrical current being provided via electrical communication with the electrical interface of the electrically driven processing array member.

Another aspect provides a knit section being designed in a variety of heights, wherein the heights can optionally be adjustable via snaps, ties, buttons and any other reasonable mechanical fastener.

In yet another aspect, a pass through filter comprising a first and second processing rings and a filter assembled therebetween. The first and second processing rings can be fabricated of a conductive material. Electrical power can be provided to the first and second conductive or processing rings to energize them. The processing rings can include a series of pass through apertures, fabricated of a porous material, and the like allowing passage of a fluid therethrough.

While another aspect integrates a return passage through each of the first and second processing rings and filter.

Another aspect includes a filtration material disposed within at least a portion of the passages of the first and/or second processing rings.

Wherein another aspect incorporates an additive delivery system having a honeycomb shaped cross sectional passages. The additive delivery system can be positioned between the first and second processing rings.

Whereas another aspect includes a filtration material disposed within at least a portion of the passages of the additive delivery system.

In another aspect of the present invention, the pass through filter includes a first attachment end and a second attachment end, wherein the first attachment end removably engages with an Original Equipment Manufacturer (OEM) bracket and the first attachment end removably engages with an OEM filter, an aftermarket filter, or a custom filter.

Yet another aspect introduces a bypass filter bracket, which includes a source line and a return line. The source line and return line are arranged in fluid communication with a remotely located bypass filter assembly.

While another aspect utilizes a transparent material for the housing of one or more of the components of the filtration system. The transparent material enables quick and accurate inspection of the quality of the filtration materials within the filtration system.

With another aspect providing an additive passage having a narrowed cross sectional dimension at one or more locations within the additive passage. The narrowed cross sectional areas act as a venturi. According to the laws governing fluid dynamics, a fluid's velocity must increase as it passes through a constriction to satisfy the principle of continuity, while its pressure must decrease to satisfy the principle of conservation of mechanical energy. Thus any gain in kinetic energy a fluid may accrue due to its increased velocity through a constriction is negated by a drop in pressure. The narrowed cross section can be fabricated using a molding process, a laminating process, and the like.

These and other features, aspects, and advantages of the invention will be further understood and appreciated by those skilled in the art by reference to the following written specification, claims and appended drawings, which follow.

BRIEF DESCRIPTION OF THE DRAWINGS

The invention will now be described, by way of example, with reference to the accompanying drawings in which:

FIG. 12 presents a top view of the enclosed reclamation device, illustrating a top view of a portion of the internal filtration members;

FIG. 13 presents an elevation sectioned view of the enclosed reclamation device of FIG. 12, enhancing details of the spiraling peripheral flow conduit configuration and introducing an additive impregnated core;

Like reference numerals refer to like parts throughout the various views of the drawings.

DETAILED DESCRIPTION OF REPRESENTATIVE EMBODIMENTS

Figure 1:
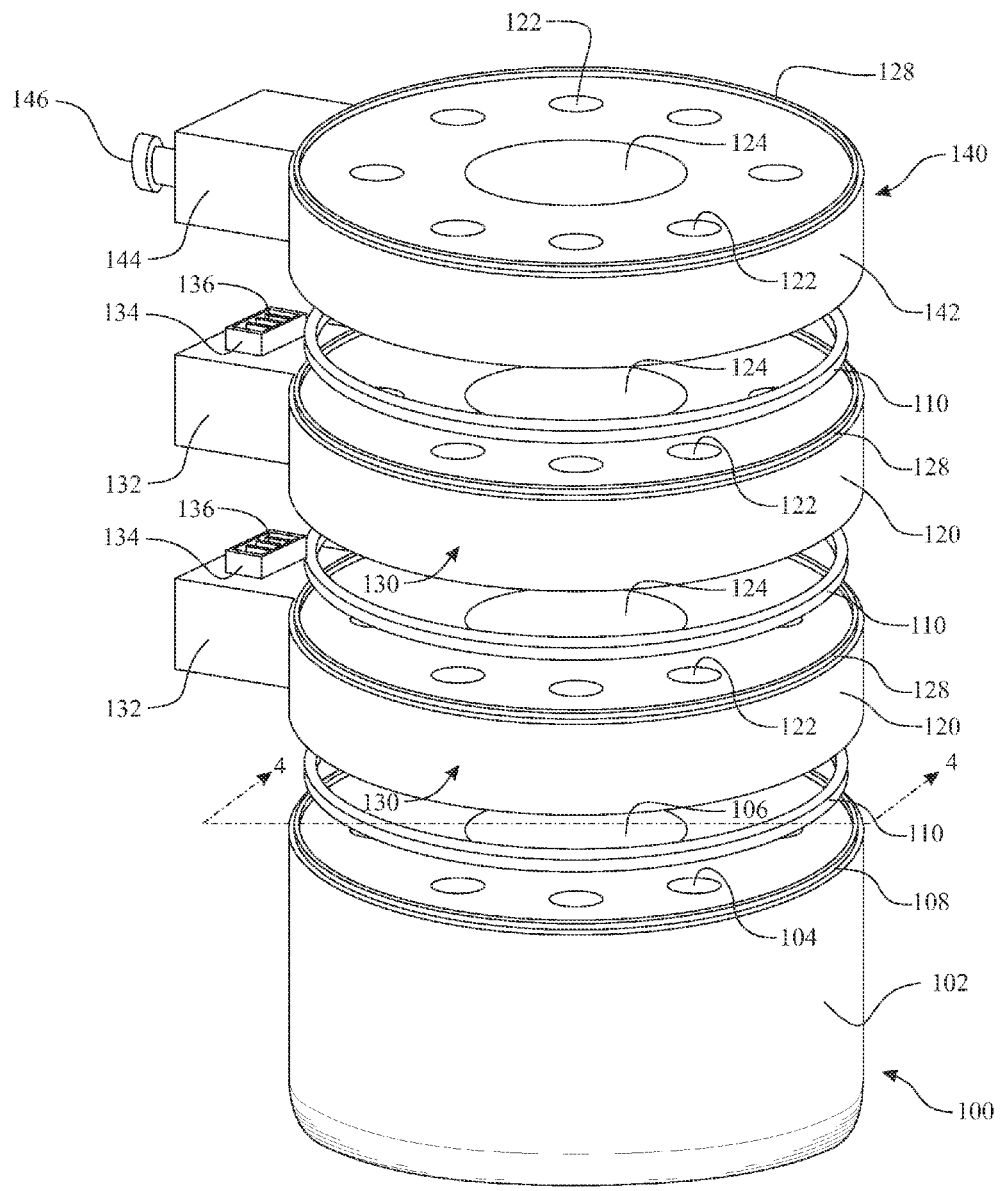
FIG. 1 presents an exploded perspective view of an exemplary embodiment of the lubricant reclamation system.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A reclamation device, generally referenced as 100, is presented throughout the disclosure illustrating several exemplary configurations. The effectiveness of the enclosed reclamation apparatus 100 can be enhanced via at least one stackable and interchangeable lubrication processing ring as presented in FIG. 1.

An enclosed reclamation apparatus 100 engages in fluid communication with an electrical array member 130. Either a second electrical array member 130, or a pneumatically operated array member 140 can be disposed upon the opposing side of the electrical array member 130. The exposed end of the enclosed reclamation apparatus 100, electrical array member 130, or pneumatically operated array member 140 engages in fluid communication with a lubrication reclamation interface (not shown, but well understood). The lubrication reclamation interface can be a bracket, a mounting feature directly attached to the power plant/engine, a remote bracket (such as for an oil sump configuration), and the like. A pliant seal 110 is affixed upon a seal feature 108 or a processing seal feature 128 and is sandwiched between of each interface providing a fluid seal. Lubricant flows into a series of processing lubricant inlet conduits 122, which create a flow path for passing through each of the pneumatically operated array member 140 and electrical array member 130 into lubricant inlet ports 104 of the enclosed reclamation apparatus 100. The lubricant is processed within the enclosed reclamation apparatus 100 and returns for use via a passage created by a lubricant outlet port 106 and each of the respective processing lubricant outlet conduits 124. The electrical array member 130 is fabricated having an electrically operated lubricant processing body 120. The electrically operated lubricant processing body 120 includes a plurality of processing lubricant inlet conduits 122 positioned circumferentially about a processing lubricant outlet conduit 124. An electrical receptacle location 132 is disposed upon the electrically operated lubricant processing body 120 providing support for an electrical connector 134. The electrical connector 134 having a series of electrical interface 136 disposed thereon, providing electrical interface to any electrically driven processing device located within the electrically operated lubricant processing body 120. The electrically driven processing device can be a filtration mechanism, a monitoring mechanism, and the like, being operated by electrical power and/or an electrical signal. A plurality of electrical array members 130 can be incorporated into the system via a stacking process as illustrated, each providing a unique electrically driven processing device. The electrically driven processing device is configured being in communication with the lubricant as the lubricate passes through at least one of the processing lubricant inlet conduits 122 and the at least one processing lubricant outlet conduit 124. Each of the series of processing lubricant inlet conduits 122 can include a respective electrically driven processing device; each device can provide similar or different processing characteristics to the others. The selected electrically driven processing devices can be respective to engine use, wear, mileage, and the like.

A pneumatically operated array member 140 provides features that are similar to the electrical array member 130, utilizing a pneumatically driven processing device, such as an oil pressure sensor. The pneumatically operated array member 140 is fabricated having a pneumatically operated lubricant processing body 142. The pneumatically operated array member 140 includes a plurality of processing lubricant inlet conduits 122 positioned circumferentially about a processing lubricant outlet conduit 124. A pneumatic receptacle location 144 is disposed upon the pneumatically operated lubricant processing body 142 providing support for a pneumatic interface 146. The pneumatic interface 146 provides a pneumatic interface between an external mechanism and the pneumatically driven processing device. The pneumatically driven processing device can be a filtration mechanism, a monitoring mechanism, and the like, being operated by pneumatic pressure. A plurality of pneumatically operated array members 140 can be incorporated into the system via a stacking process (in a manner similar to the plurality of electrical array members 130 illustrated), each providing a unique pneumatically driven processing device. The pneumatically driven processing device is configured being in communication with the lubricant as the lubricate passes through at least one of the processing lubricant inlet conduits 122 and the processing lubricant outlet conduits 124. The pneumatic interface 146 can be of any known pneumatic connecting device.

Figure 2:
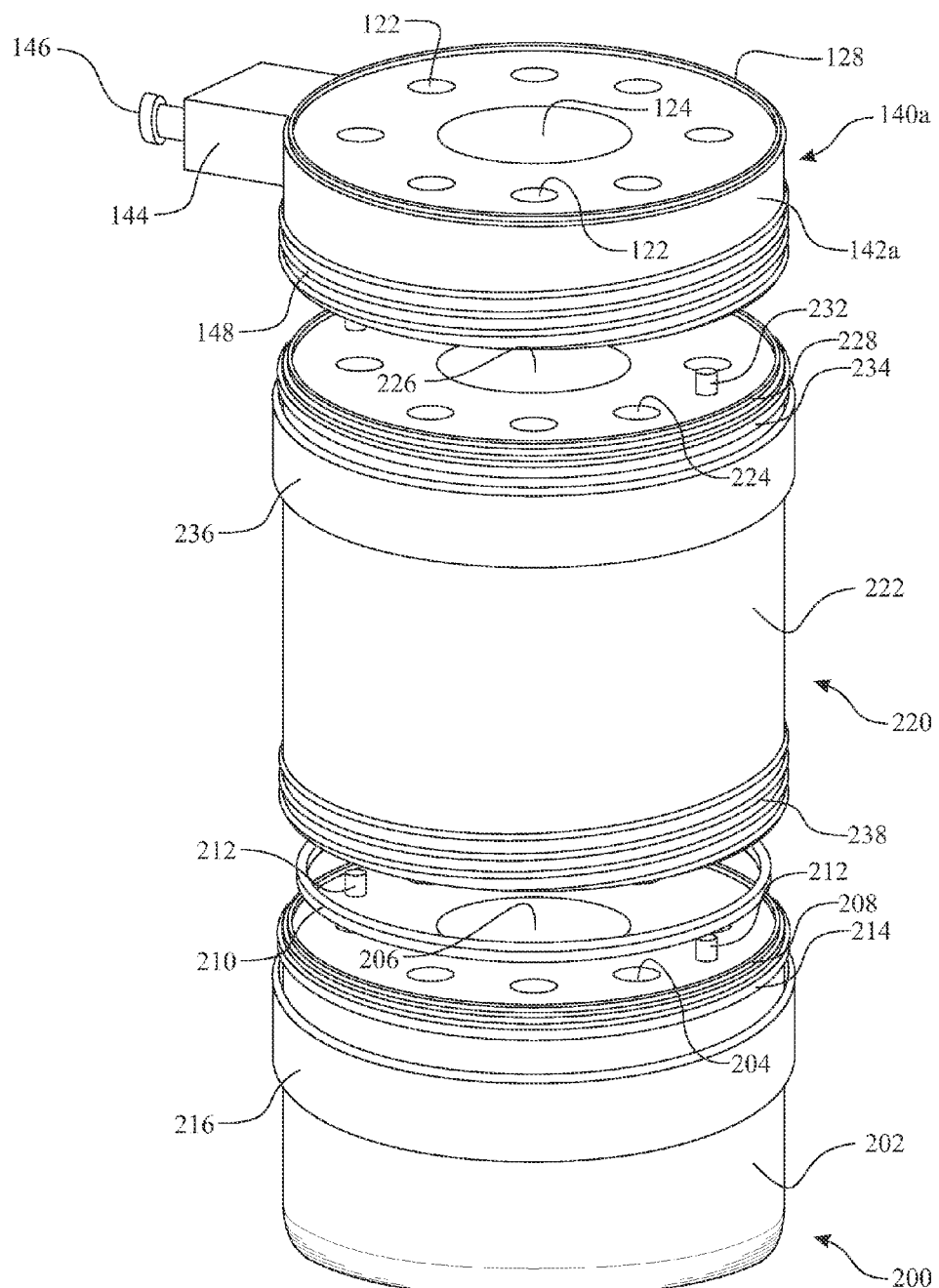
FIG. 2 presents an exploded perspective view of a first alternate exemplary embodiment of the lubricant reclamation system comprising a pass through lubricant reclamation device.
Figure 3:
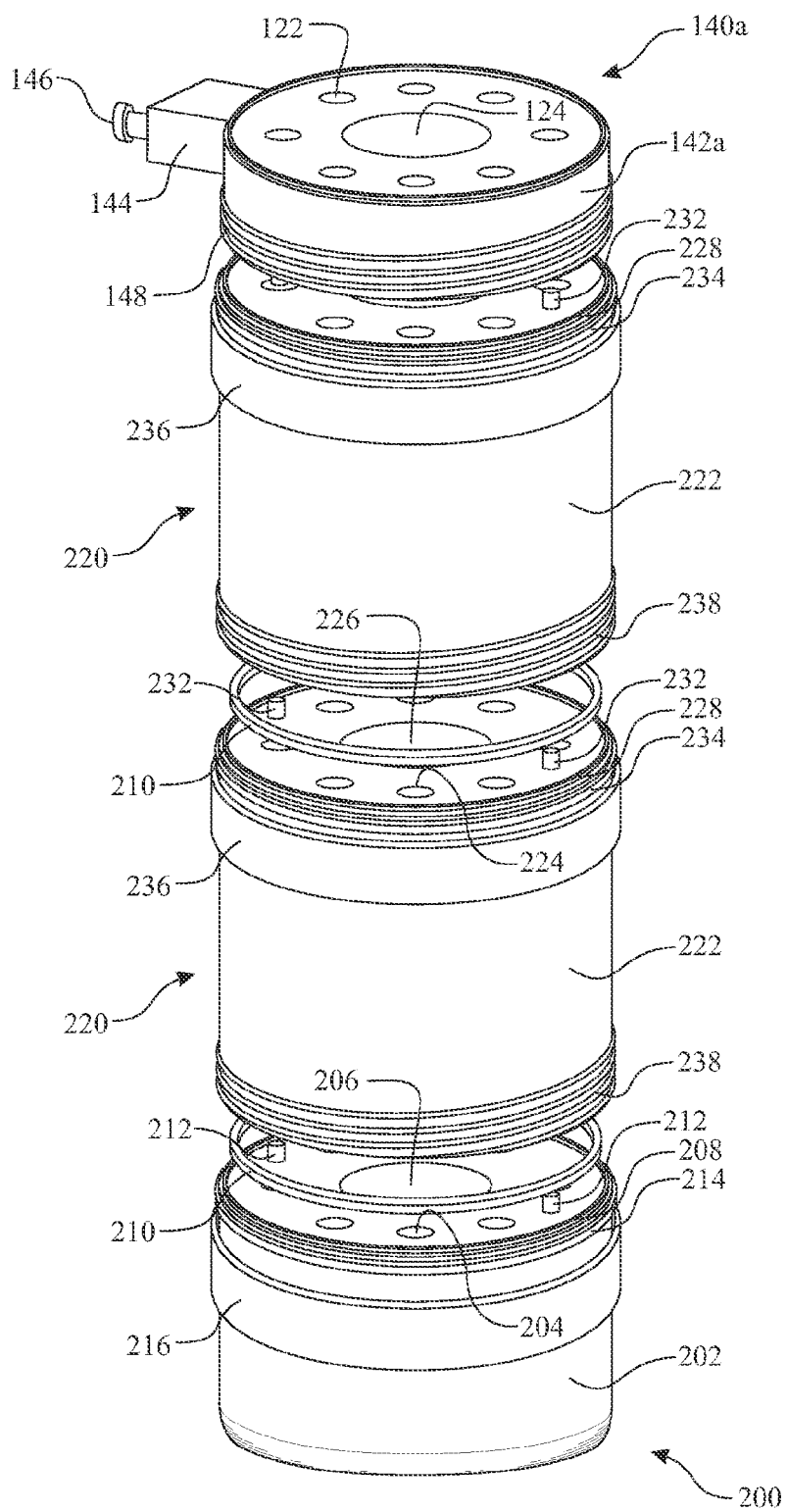
FIG. 3 presents an exploded perspective view of the first alternate exemplary embodiment of FIG. 2, incorporating a plurality of pass through lubricant reclamation devices.
Figure 4:
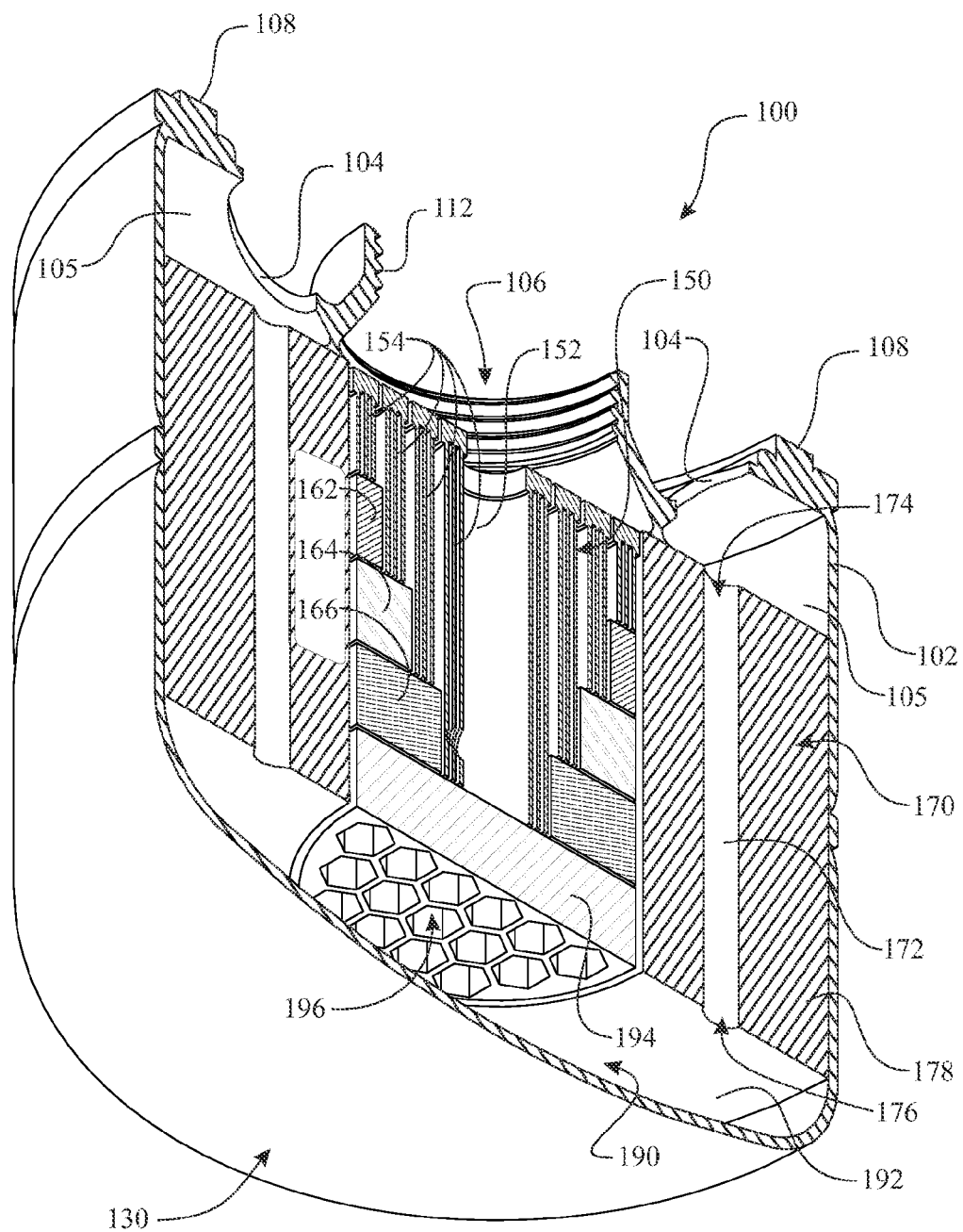
FIG. 4 presents an isometric sectioned view of the enclosed reclamation device taken along section 4-4 of FIG. 1 presenting a first (linear) peripheral flow conduit configuration.

Enhanced configurations of the reclamation system are presented in FIGS. 2 and 3. The enhanced reclamation system couples an enclosed registering reclamation device 200 (contained within a registering filter housing 202) to a pass through reclamation device 220 (contained within a pass through filter housing 222), which is coupled to a pneumatically operated array member 140*a*. A plurality of pass through reclamation devices 220 can be assembled in series to compensate for desired processing.

The enhanced reclamation system provides enclosed registering reclamation device 200 incorporating features ensuring proper registration between a series of lubricant inlet conduits 204 and a series of lubricant inlet conduits 224 of a pass through reclamation device 220. The exemplary means of ensuring proper registration utilizes a plurality of registration members 212, which engages with an opposing registration feature (not shown but understood), such as a plurality of pins and respective bores. The installer aligns the registration member 212 of the enclosed registering reclamation device 200 to the opposing registration feature of the pass through reclamation device 220, then secures the two reclamation devices 200, 220 via securing a fastening ring 216 about housing intercoupling threads 238. The fastening ring 216 includes a flange which engages with a fastening flange 214 located proximate a coupling edge of a registering filter housing 202 of the enclosed registering reclamation device 200. The lubricant outlet conduit 206 is subsequently registered to the lubricant outlet conduit 226, as each of the ports 206, 226 are all centrally positioned. A pliant seal 210 is placed between the enclosed registering reclamation device 200 and the pass through reclamation device 220 providing a fluid seal. A seal feature 208 provides a mechanical interface for assisting the pliant seal 210 in ensuring the fluid seal.

The enhanced reclamation system further incorporates similar features ensuring proper registration between a series of lubricant inlet conduits 224 and the series of processing lubricant inlet conduits 122 of the pneumatically operated array member 140a. The exemplary means of ensuring proper registration utilizes a plurality of registration members 232, which engage with an opposing registration feature disposed upon the mating face of the pneumatically operated array member 140a. The installer aligns the registration member 232 of the pass through reclamation device 220 to the opposing registration feature of the pneumatically operated array member 140a, then secures the two reclamation devices 140a, 220 via securing a fastening ring 236 about an array member intercoupling threading 148 of the pneumatically operated array member 140a. The fastening ring 236 includes a flange which engages with a fastening flange 234 located proximate a coupling edge of a pass through filter housing 222 of the pass through reclamation device 220. The lubricant outlet conduit 226 is subsequently registered to the processing lubricant outlet conduits 124, as the port 124 is also centrally positioned. A pliant seal similar to 212 is placed between the mating surfaces of the pass through filter housing 222 and the pneumatically operated lubricant processing body 142a. A seal feature 228 provides a mechanical interface for assisting the pliant seal similar to 212 in ensuring the fluid seal.

Details of the internal components of the enclosed reclamation apparatus 100 and the respective design variants are presented in FIGS. 4 through 14. The figures present an enclosed reclamation apparatus 100 having each of the following peripheral conduit geometries:

a. A enclosed reclamation apparatus 100 (FIG. 4) having a plurality of substantially vertical peripheral flow conduits 172 which passes substantially vertically between a lubricant inlet manifold 105 and a base filtering material 192;

b. A enclosed reclamation apparatus 100a (FIGS. 6 and 7) having a plurality of substantially vertical peripheral flow conduits 172 which provides a fluid flow path substantially vertical from said lubricant inlet manifold 105 towards said base filtering material 192, and being redirected via a plurality of substantially horizontal peripheral flow conduits 180, exiting via a peripheral conduit exit 176 into a centralized core filter section 150;

c. A enclosed reclamation apparatus 100b (FIG. 8) having a plurality of substantially vertical peripheral flow conduits 172a which provides a fluid flow path substantially vertical from said lubricant inlet manifold 105 towards said base filtering material 192, tapering from an entrance diameter to a smaller exiting diameter, the discharging diameter being either within a peripheral filtering material 178 or into said base filtering material 192; and d. A enclosed reclamation apparatus 100c (FIGS. 9 through 14) having a plurality of spiraling conduits 182 originating a fluid flow path at said lubricant inlet manifold 105, providing a spiraling flow path which discharges into the centralized core filter section 150.

The enclosed reclamation apparatus 100 is fabricated having an enclosed filter assembly housing 102 encasing the reclamation configuration. An inter-coupling surface of the enclosed filter assembly housing 102 includes various flow ports, including a plurality of lubricant inlet ports 104, providing an inlet flow conduit for the lubricant, and a lubricant outlet port 106 providing a discharge flow conduit for the lubricant. The enclosed reclamation apparatus 100 is optionally coupled to the reclamation system via a filter mount threading 112.

The reclamation configuration can be defined into three separate subsections: a centralized core filter section 150, a peripheral filter section 170, and a base filtering section 190. The centralized core filter section 150 (detailed in FIG. 5 herein) utilizes two independent filtration systems: a series of core filtering laminates 154 being disposed about a central section (a core conduit 152) of the centralized core filter section 150 and a series of crossover filtering materials positioned proximate the centralized core filter section 150—peripheral filter section 170 interface. Each core filtering laminates 154 can be fabricated having layers such as an outermost permeable laminate 156, a central permeable laminate 158, and an innermost permeable laminate 160. The various layers can be of the same or differing materials, and any number of layers, based upon the desired filtration characteristics. The passageway through the layers 156, 158, 160 can additionally generate liquid resonance, each resonance being fed via a transitional flow such as flows 310, 312, 314 (FIG. 6).

The peripheral filter section 170 includes a peripheral filtering material 178 surrounding a plurality of flow conduits, such as the various configurations of the substantially vertical peripheral flow conduit 172, the spiraling conduit 182, and the like. The conduits can optionally include a filtration material disposed therein. The conduit filtration material can be similar or distinct compared to the peripheral filtering material 178. The base filtering section 190 includes a base filtering material 192 providing additional filtration. The flow transfers the processed lubricant into a lubricant return pathway 196 passing through a secondary base filtering material 194. An additive impregnated core 198 can be used in conjunction with or replace the secondary base filtering material 194, wherein the additive impregnated core 198 is impregnated with a time releasing lubricant additive.

Flow rates of lubricant flowing through the lubricant return pathway 196 can be controlled via any number of ways. One such means utilizes an electrically or pneumatically operated flow control such as an adjustable shutter. Another is via material selection. The secondary base filtering material 194/additive impregnated core 198 can be exchangeable or replaceable via a removable section at the respective end of the enclosed filter assembly housing 102. The frame structure of the secondary base filtering material 194 can be designed incorporating a series of apertures having cross sectional areas that change along the direction of flow, thus accelerating or de-accelerating the flow rates. The secondary base filtering material 194 can be impregnated with a dissolving material; whereto the flow rate changes over the life cycle of the secondary base filtering material 194. The secondary base filtering material 194 can be impregnated with a low viscosity fluid additive further controlling the flow rate as well as providing absorption of the fluid additive. The secondary base filtering material 194 provides a means for pressure equalization throughout the various flow channels of the reclamation system.

In a preferred embodiment, the finest filtration flow passes in accordance with the base filtering flow 308 and is processed through the secondary base filtering material 194/additive impregnated core 198. The secondary base filtering material 194/additive impregnated core 198 is illustrated having a framework fabricated via an extrusion, molding, or other process. The additive impregnated core 198 preferably has a honeycomb cross-section, but can be of any selected geometry. The framework can be formed incorporating a time releasing lubricant additive. The secondary base filtering material 194 can be inserted within the open sections of the framework of the additive impregnated core 198. The secondary base filtering material 194 is dense enough to allow a predetermined flow rate of lubricant (having a specific viscosity and temperature range) to be forced through the secondary base filtering material 194. The secondary base filtering material 194 can, but not necessarily, be the same material as the base filtering material 192.

The secondary base filtering material 194/additive impregnated core 198 can comprise an electrically driven processing device such as an ionization device. The electrically driven processing device is controlled via electrical communication with the electrical array member 130. Alternately, the secondary base filtering material 194 can be of a material having magnetic properties.

Figure 5:
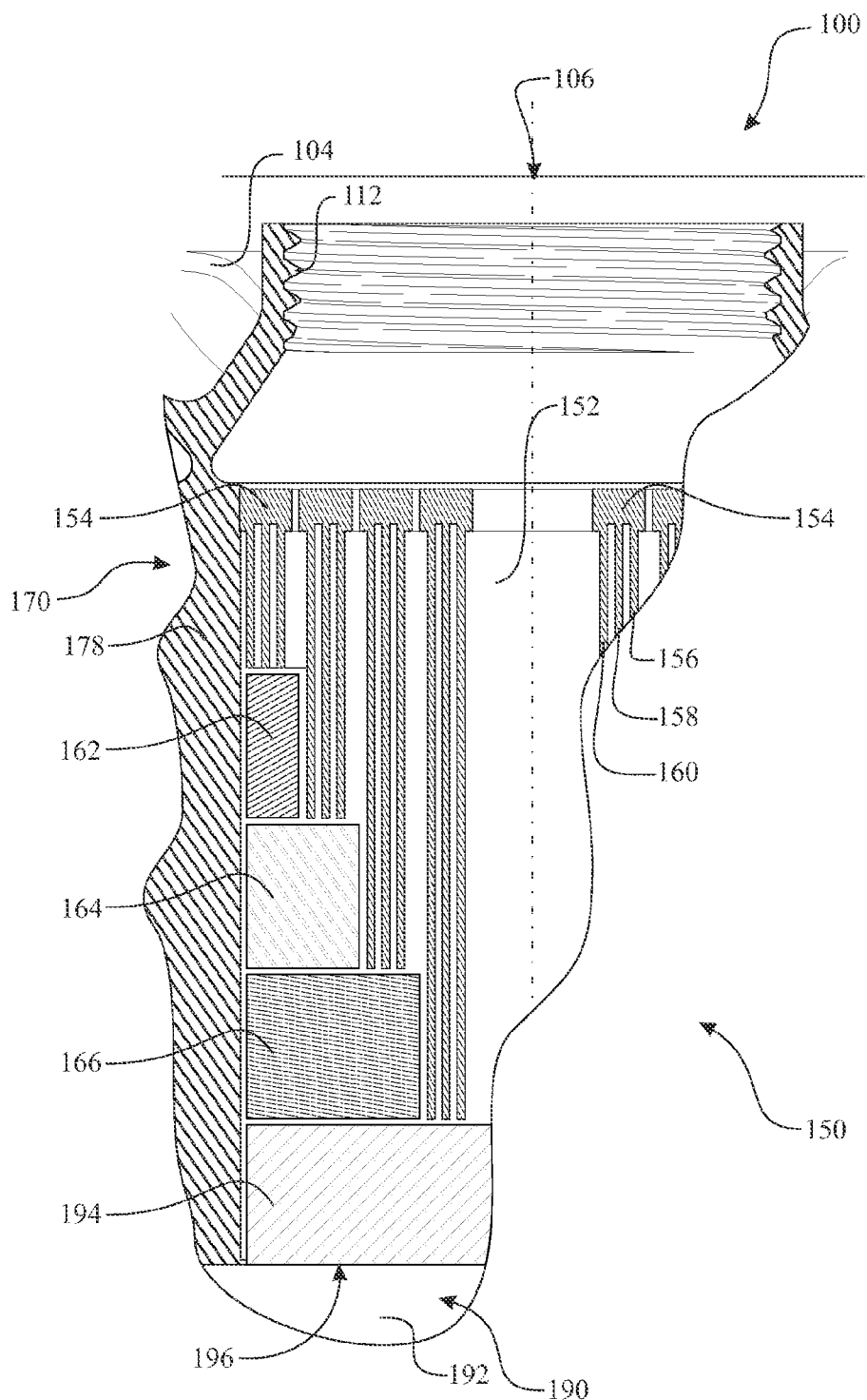
FIG. 5 presents a detailed view of a portion of a centralized core filter section of the enclosed reclamation device of FIG. 1.
Figure 6:
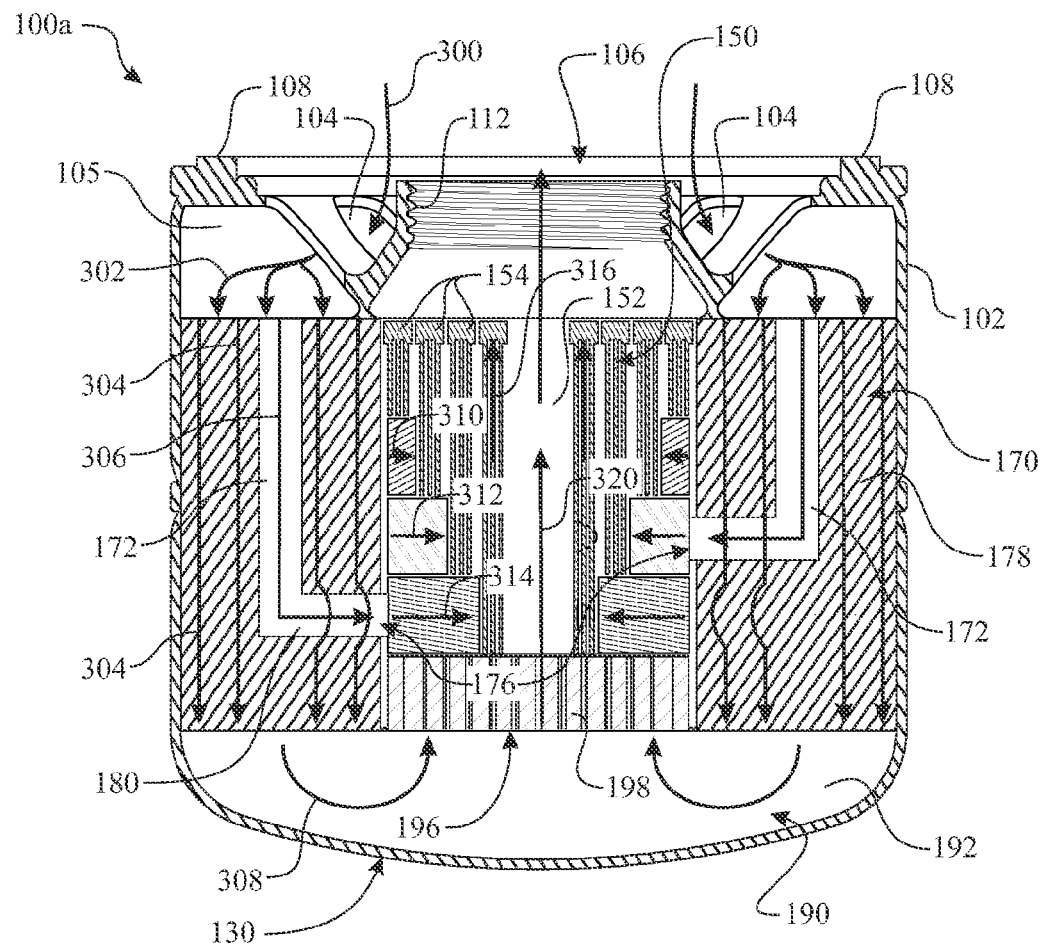
FIG. 6 presents a sectioned view of the enclosed reclamation device taken along section 4-4 of FIG. 1 describing a representative flow path of a second (redirecting) peripheral flow conduit configuration.
Figure 7:
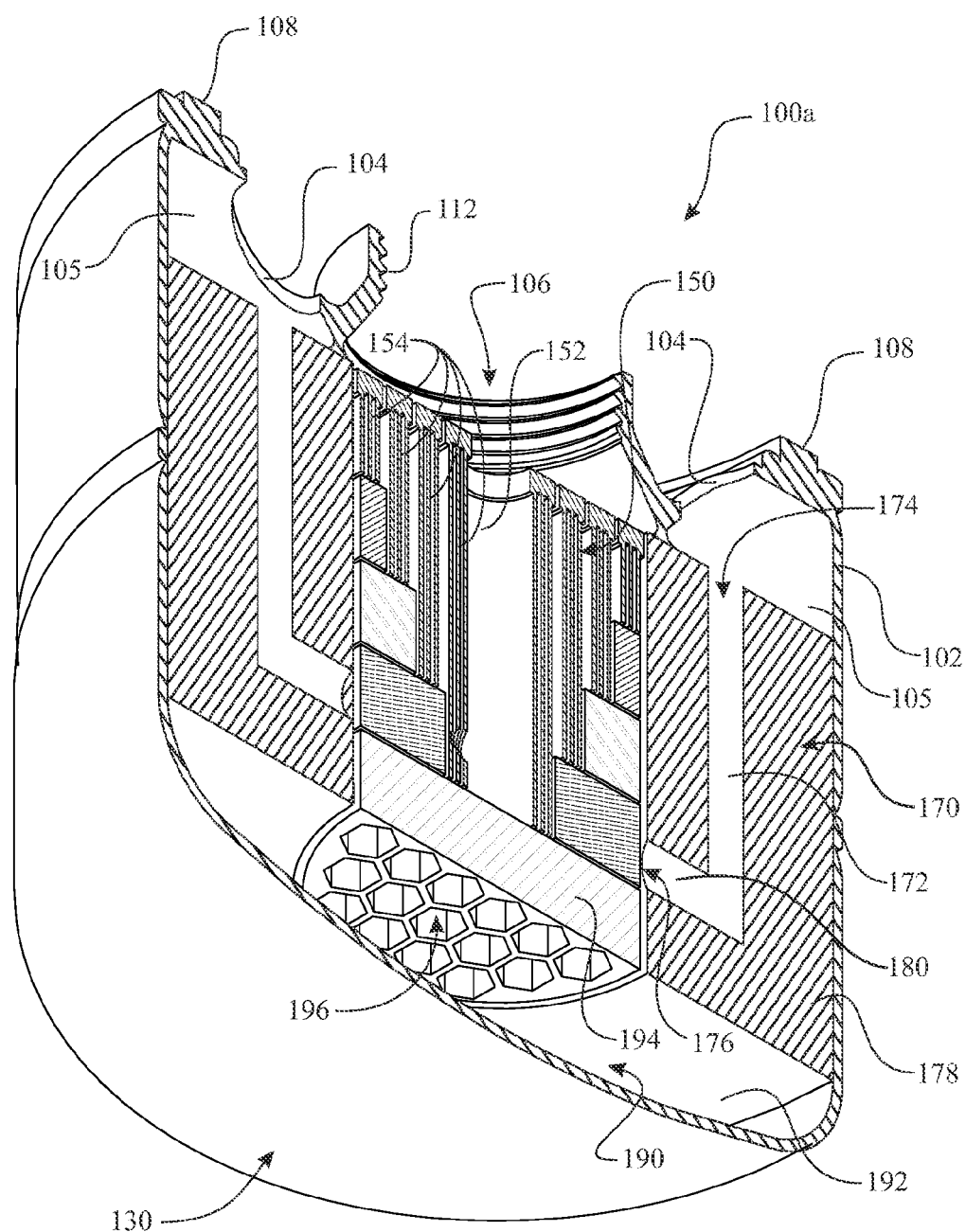
FIG. 7 presents an isometric sectioned view of the enclosed reclamation device previously illustrated in FIG. 6.
Figure 8:
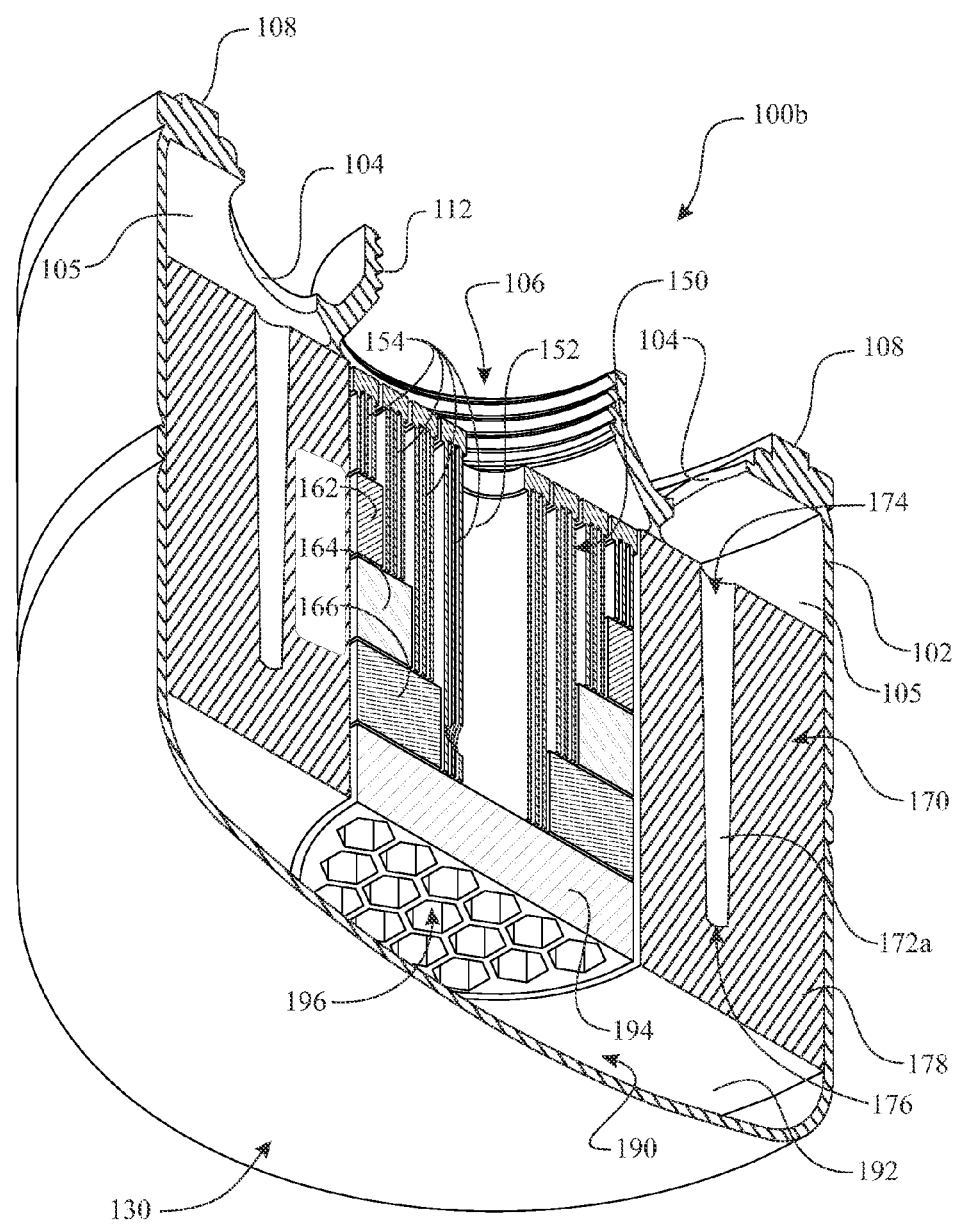
FIG. 8 presents an isometric sectioned view of the enclosed reclamation device taken along section 4-4 of FIG. 1, presenting a third (tapering) peripheral flow conduit configuration.
Figure 9:
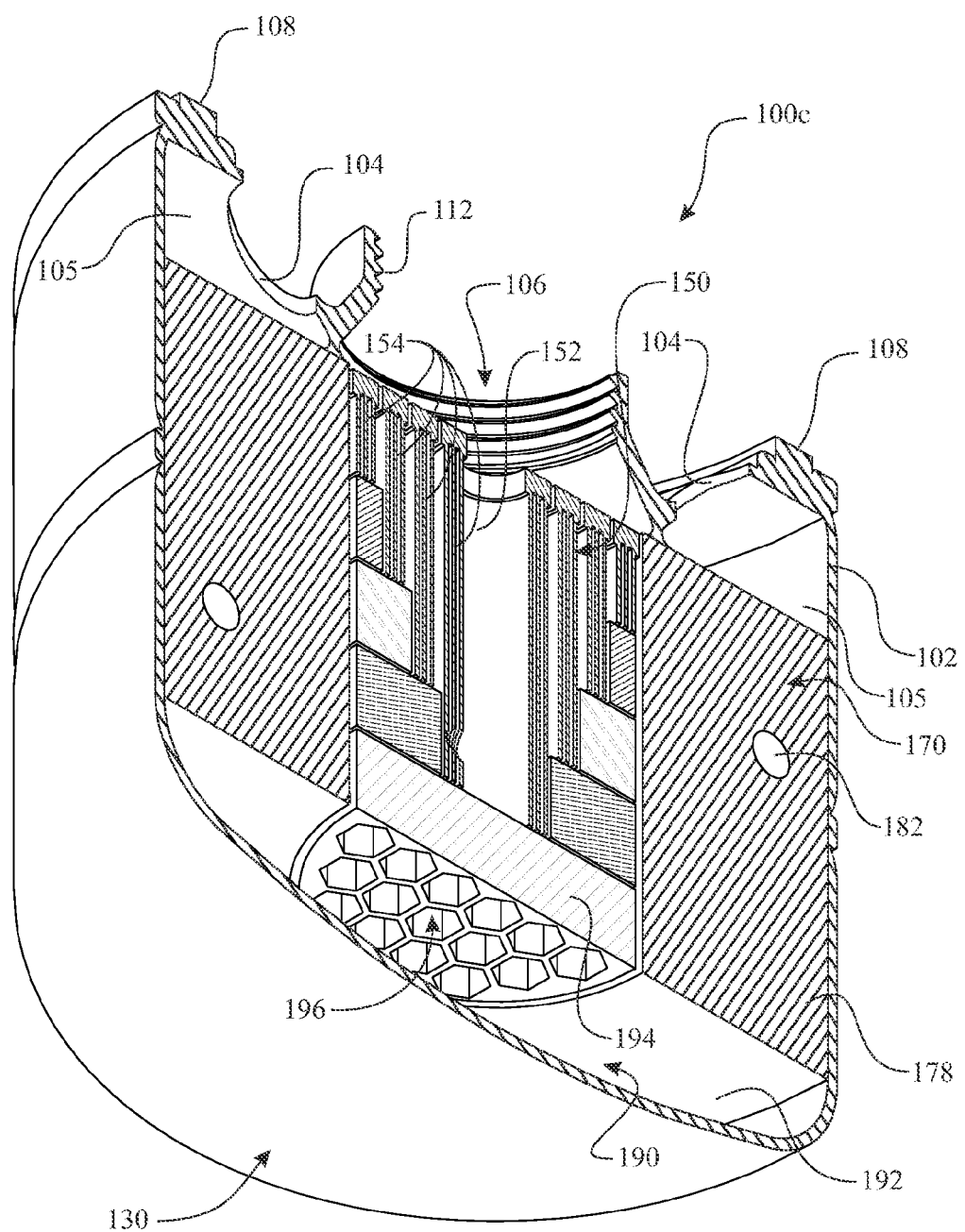
FIG. 9 presents an isometric sectioned view of the enclosed reclamation device taken along section 4-4 of FIG. 1, presenting a fourth (spiraling) peripheral flow conduit configuration.
Figure 10:
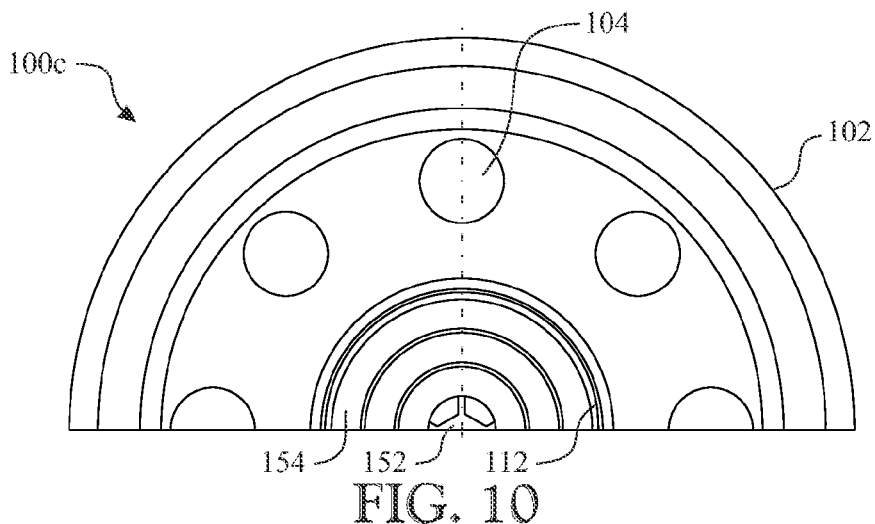
FIG. 10 presents a top view of the enclosed reclamation device.
Figure 11:
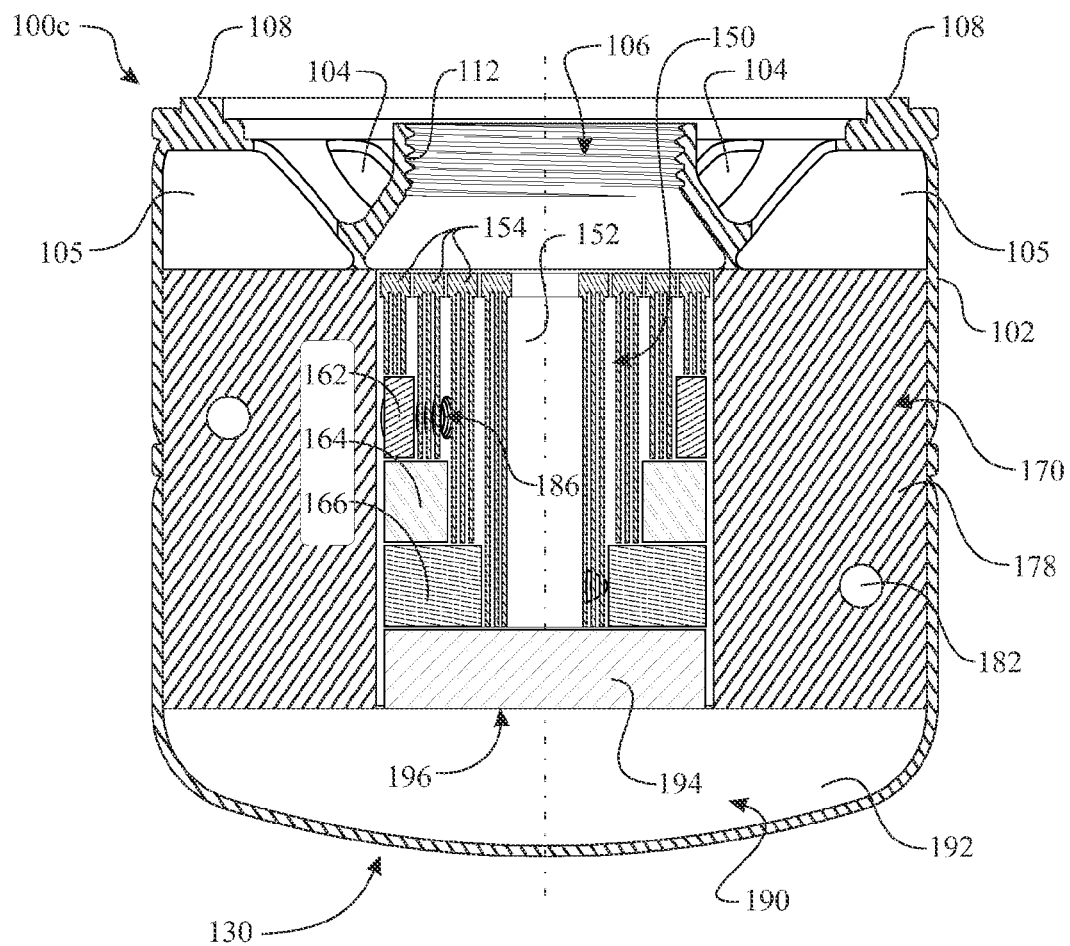
FIG. 11 presents an elevation sectioned view of the enclosed reclamation device taken along section 4-4 of FIG. 1, presenting the fourth (spiraling) peripheral flow conduit configuration and a base filtration system.
Figure 14:
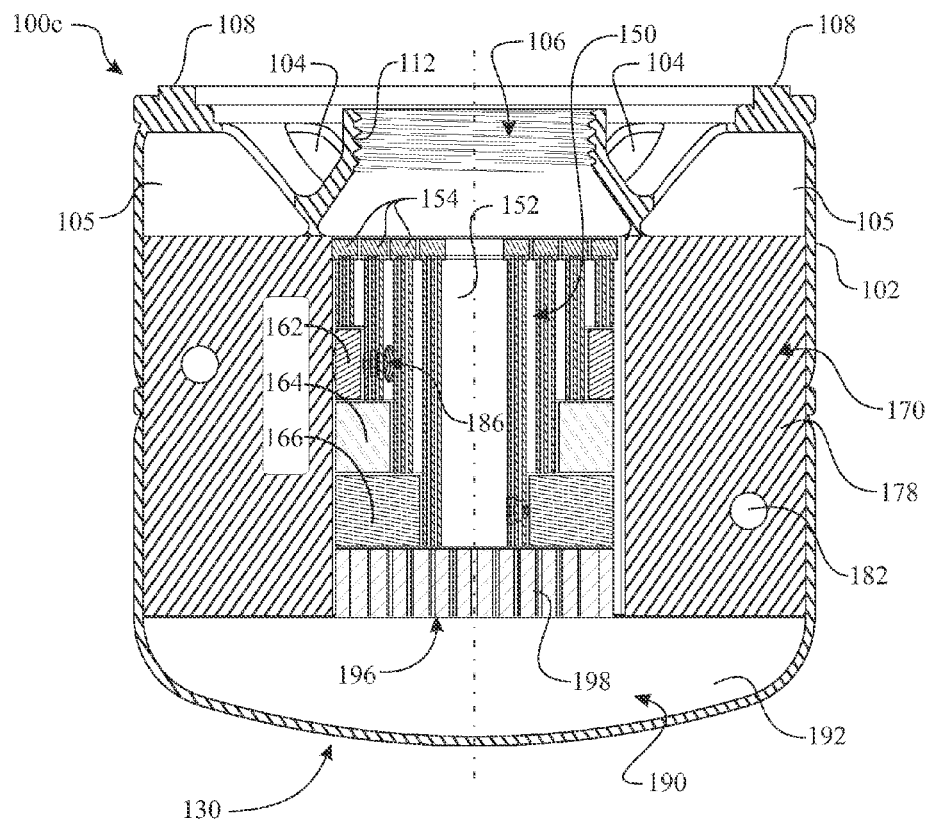
FIG. 14 presents an elevation sectioned view of the enclosed reclamation device of FIG. 13.

A representative flow path is demonstrated in FIG. 6 with details of the centralized core filter section 150 being provided in an exploded portional view illustrated in FIG. 5. Flow enters the enclosed reclamation apparatus 100 via an inlet flow 300 passing through the series of lubricant inlet ports 104 into a lubricant inlet manifold 105. The flow is distributed via a manifold distributing flow 302 passing partially into a peripheral filtering material 178 (via peripheral filtering flow 304) and partially into the incorporated peripheral conduits (wherein a substantially vertical peripheral flow conduit 172 is presented in the exemplary embodiment) (via peripheral conduit flow 306). The exemplary embodiment redirects the peripheral conduit flow 306 within the substantially vertical peripheral flow conduit 172 via a substantially horizontal peripheral flow conduit 180 discharging the flow via an exit port of the peripheral conduit such as a peripheral conduit exit 176 shown in the exemplary embodiment. The horizontal positioning of the substantially horizontal peripheral flow conduit 180 can vary and is preferably such to position the respective peripheral conduit exit 176 discharging into each of a first core crossover filtering material 162, a second core crossover filtering material 164, and a nth core crossover filtering material 166, providing flows upper transitional flow 310, mid-level transitional flow 312 and lower transitional flow 314 respectively. It is recognized that the transitional flows 310, 312, 314 can continue radially through the series of layers of the core filtering laminates 154. The crossover filtering materials 162, 164, 166 can be of a variety of designs, including having a permeable wall, a filtration material disposed therein, a flow through port, an electrically charged membrane, a pneumatically activated design, and the like. The configurations can discharge the lubricant along the filter's axial direction, along the radial direction (as shown), or both. Although not shown, the filter can be design providing lubricant flow directly from the peripheral filtering material 178 and the core filtering laminates 154, crossover filtering materials 162, 164, and 166.

A base filtering flow 308 collects lubricant from the peripheral filtering flow 304, processes the lubricant within base filtering section 190 via a base filtering material 192 and passes the lubricant through an additive impregnated core 198, into the centralized core filter section 150. Lubricant can flow through the core filtering laminates 154 axially via a laminate filtering flow 316, radially (parallel to the transitional flow 310), or both. The lubricant within the filter exits via a collective discharging flow 320, exiting via the lubricant outlet port 106.

The configuration of the peripheral conduits can vary dependant upon the desired filtration process. In accordance with the first embodiment filter 100, a substantially vertical peripheral flow conduit 172 passes substantially vertically between a lubricant inlet manifold 105 and a base filtering material 192. A plurality of substantially vertical peripheral flow conduits 172 are disposed within the peripheral filter section 170, preferably in a circular pattern, evenly distributed about the center of the filter 100. A peripheral conduit entrance 174 provides fluid communication between the lubricant inlet manifold 105 and the substantially vertical peripheral flow conduit 172, providing an entrance port for the peripheral conduit flow 306. A filtration material can be disposed within the substantially vertical peripheral flow conduit 172 providing additional filtration. Alternately, the substantially vertical peripheral flow conduit 172 can be hollow providing reduced flow resistance for the lubricant, such that a portion of the lubricant flows, exiting via a peripheral conduit exit 176 directly into the base filtering section 190.

In accordance with the second embodiment filter 100*a*, a substantially vertical peripheral flow conduit 172 provides a fluid flow path substantially vertical from said lubricant inlet manifold 105 towards said base filtering material 192, being redirected via a plurality of substantially horizontal peripheral flow conduits 180, exiting through the peripheral conduit exit 176 into a centralized core filter section 150. A plurality of substantially vertical peripheral flow conduits 172 is disposed within the peripheral filter section 170, preferably in a circular pattern, evenly distributed about the center of the filter 100*a*. The peripheral conduit entrance 174 provides fluid communication between the lubricant inlet manifold 105 and the substantially vertical peripheral flow conduit 172, providing an entrance port for the peripheral conduit flow 306. Filtration material can be disposed within the substantially vertical peripheral flow conduit 172 providing additional filtration. Alternately, the substantially vertical peripheral flow conduit 172 can be hollow providing reduced flow resistance for the lubricant, such that a portion of the lubricant flows, exiting via a peripheral conduit exit 176 directly into the centralized core filter section 150. The exiting flow is presented as upper transitional flow 310, mid-level transitional flow 312, and lower transitional flow 314.

In accordance with the third embodiment filter 100*b*, a substantially vertical peripheral flow conduit 172*a* provides tapering from an entrance diameter to a smaller exiting diameter, the discharging diameter being either within a peripheral filtering material 178 or into said base filtering material 192. A plurality of substantially vertical peripheral flow conduits 172*a* are disposed within the peripheral filter section 170, preferably in a circular pattern, evenly distributed about the center of the filter 100*b*. The peripheral conduit entrance 174 provides fluid communication between the lubricant inlet manifold 105 and the substantially vertical peripheral flow conduit 172, providing an entrance port for the peripheral conduit flow 306. Filtration material can be disposed within the substantially vertical peripheral flow conduit 172 providing additional filtration. Alternately, the substantially vertical peripheral flow conduit 172 can be hollow providing reduced flow resistance for the lubricant, such that a portion of the lubricant flows, exiting via a peripheral conduit exit 176 into the centralized core filter section 150. The wall of the substantially vertical peripheral flow conduit 172 can be fabricated of a porous material, allowing the lubricant to pass through the wall of the substantially vertical peripheral flow conduit 172. The spiraling configuration introduces a centrifugal force to the lubricant, which can be utilized as a function of the filtration process.

In accordance with the fourth embodiment filter 100*c*, a spiraling conduit 182 provides a spiraling fluid flow path directed from said lubricant inlet manifold 105 discharging into said centralized core filter section 150. A plurality of spiraling conduits 182 are disposed within the peripheral filter section 170, preferably in a circular pattern, evenly distributed about the center of the filter 100*c* (FIG. 12). A peripheral conduit entrance 174 provides fluid communication between the lubricant inlet manifold 105 and the spiraling conduit 182, providing an entrance port for the peripheral conduit flow 306. Filtration material can be disposed within the substantially vertical peripheral flow conduit 172 providing additional filtration. Alternately, the substantially vertical peripheral flow conduit 172 can be hollow providing reduced flow resistance for the lubricant, such that a portion of the lubricant flows, exiting via a spiraling conduit exit port 186 into a lower portion of the peripheral filtering material 178. The wall of the substantially vertical peripheral flow conduit 172 can be fabricated of a porous material, allowing the lubricant to pass through the wall of the substantially vertical peripheral flow conduit 172.

The conduits 172, 182 can optionally be fabricated of an electrically conductive or magnetic material. For an electrically conductive embodiment, the electrically conductive portion of the conduits 172, 182 can be in electrical communication with the electrical array member 130. The interfacing configurations presented via enclosed registering reclamation device 200 and pass through reclamation device 220 ensure proper registration between components, thus providing a means for registering electrical communication between the components.

Figure 15:
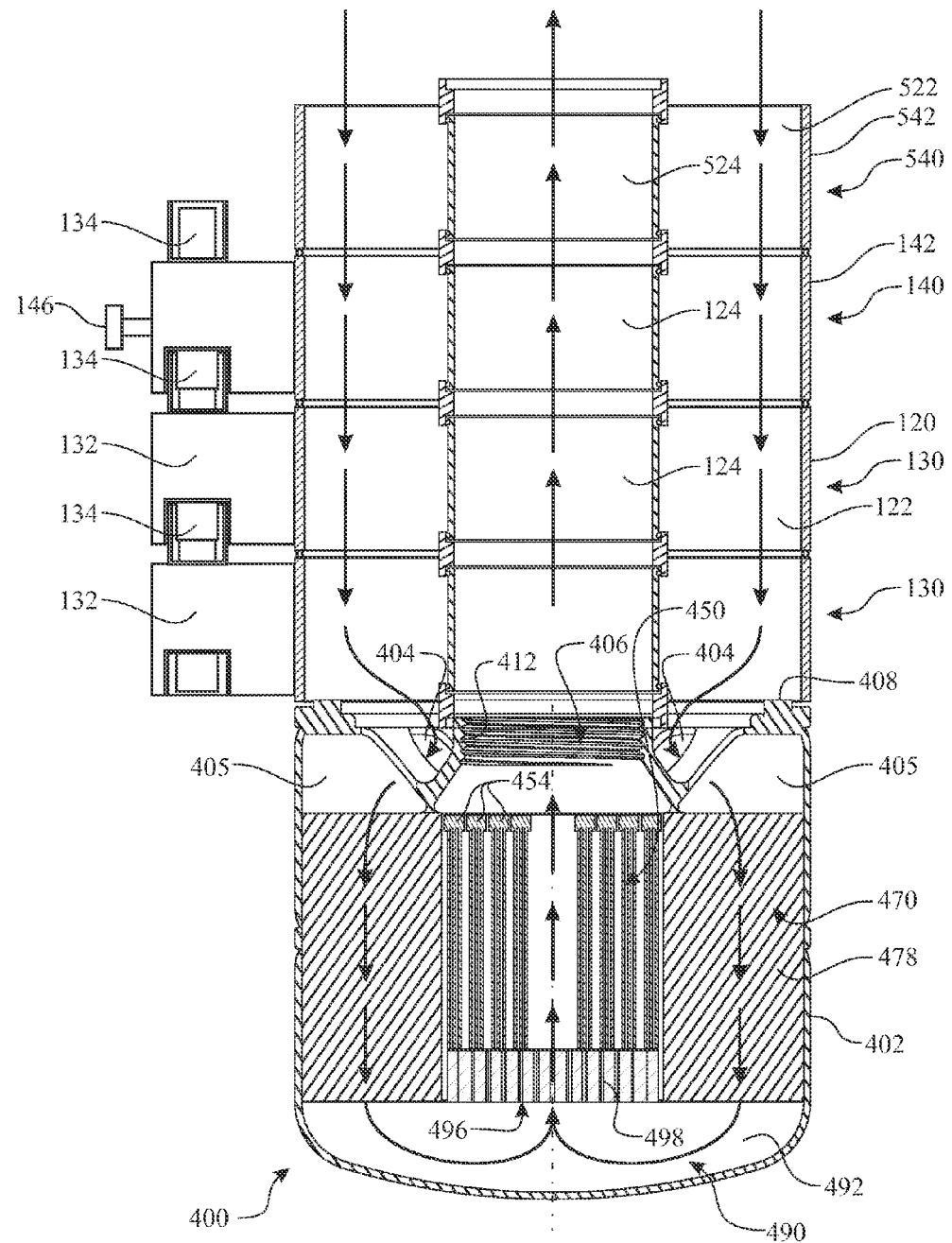
FIG. 15 presents an elevation sectioned view of an exemplary filtration system comprising one or more stacked processing members, an Original Equipment Manufacturer (OEM) bracket, and an enclosed reclamation apparatus.

One or more electrical array members 130 and/or one or more pneumatically operated array members 140 can be inserted between a standard OEM bracket 540 and an enclosed reclamation apparatus 400, as presented in the exemplary embodiment illustrated in FIG. 15. The standard OEM bracket 540 is provided in any existing Original Equipment Manufacturer (OEM) lubricant reclamation system. The standard OEM bracket 540 is fabricated having a bracket body 542. The bracket body 542 retains a bracket lubricant supply conduit 522 and a bracket lubricant return conduit 524. The bracket lubricant supply conduit 522 and bracket lubricant return conduit 524 may be integrated into the bracket body 542 or fabricated separately and subsequently assembled thereto. The standard OEM bracket 540 includes a feature for assembling the enclosed reclamation apparatus 400 thereto, such as a threaded interface, a quick disconnect, and the like. The electrical array member 130 and pneumatically operated array member 140 would comprise a mating feature for assembly of the electrical array member 130 and/or the pneumatically operated array member 140 to the standard OEM bracket 540. Similarly, the electrical array member 130 and/or the pneumatically operated array member 140 comprise a feature for removably mating with the enclosed reclamation apparatus 400. In the exemplary embodiment, a threaded section is adapted to the discharge port portion of the electrical array member 130.

The enclosed reclamation apparatus 400 comprises a number of like elements originally included in the enclosed reclamation apparatus 100 of FIGS. 6 through 14, wherein like elements are numbered the same except preceded by the numeral '4'. The enclosed reclamation apparatus 400 include an enclosed filter assembly housing 402, which provides a fluid control boundary and an encapsulation for retention of the various operational elements of the assembly. A filter mount threading 412 is formed to releasably engage with a threaded section (or other releasable mating form factor) of the electrical array member 130. A seal feature 408 is included to provide a fluid seal between the electrical array member 130 and the enclosed reclamation apparatus 400. The fluid seal may be a rubber gasket, a silicone gasket, a cork gasket, a paper gasket, and the like. A series of lubricant inlet ports 404 creates a pathway for the lubricant to enter into the enclosed reclamation apparatus 400. The lubricant is then distributed to a peripheral filter section 470 by a lubricant inlet manifold 405. The peripheral filter section 470 is partially or completely filled with a peripheral filtering material 478. The partially reclaimed lubricant continues into a base filtering section 490. The base filtering section 490 may remain void of any material or may be filled with a base filtering material 492. The base filtering section 490 may be provided to collect sludge, may include a magnet to collect metallic particles, and the like. The lubricant continues through an oil return pathway 496. An additive impregnated core 498 may be provided to introduce an additive into the lubricant. A plurality of core filtering laminates 454 or other filtration materials may be included within a centralized core filter section 450 of the oil return pathway 496. The additive impregnated core 498 can be located at either or both ends of the core filtering laminates 454. The reclaimed fluid returns to the system, passing through a lubricant outlet port 406. The lubricant continues through the processing lubricant outlet conduits 124 of each of the electrical array members 130 and pneumatically operated array members 140. The lubricant finally passes through the bracket lubricant return conduit 524 and returns to the sump, pan or other storage container.

Figure 16:
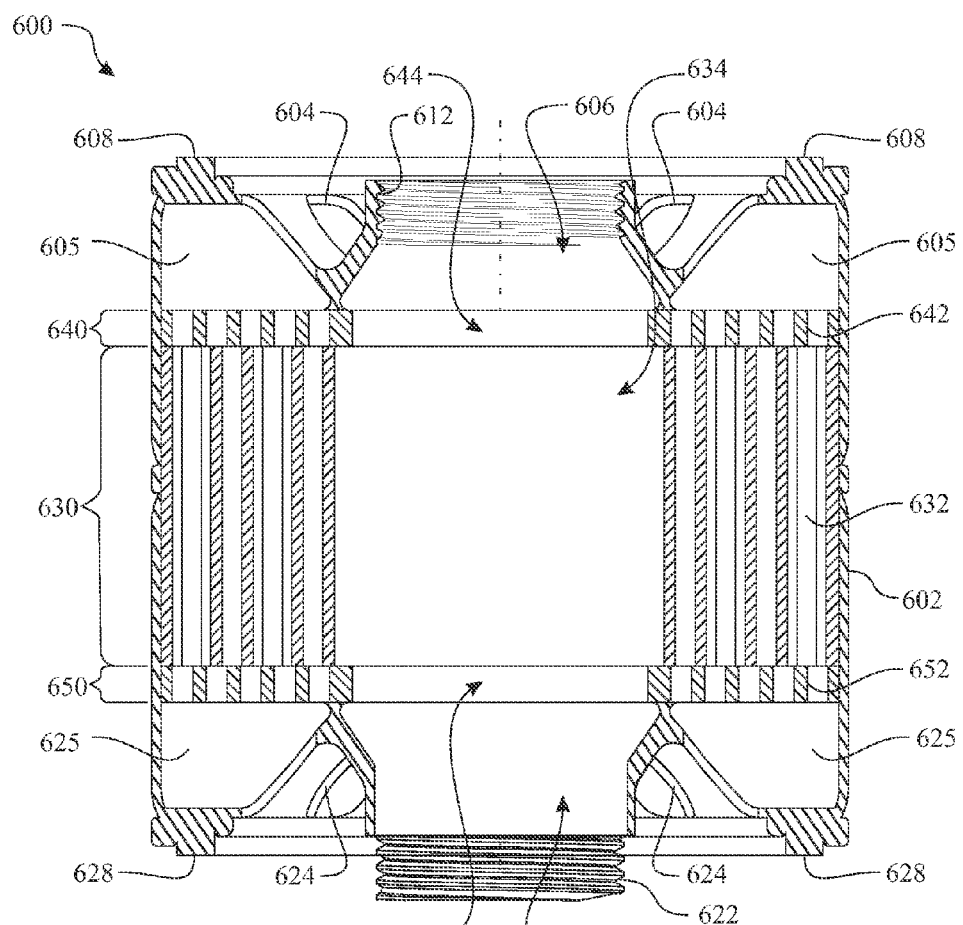
FIG. 16 presents an elevation sectioned view of an exemplary pass through reclamation assembly.
Figure 17:
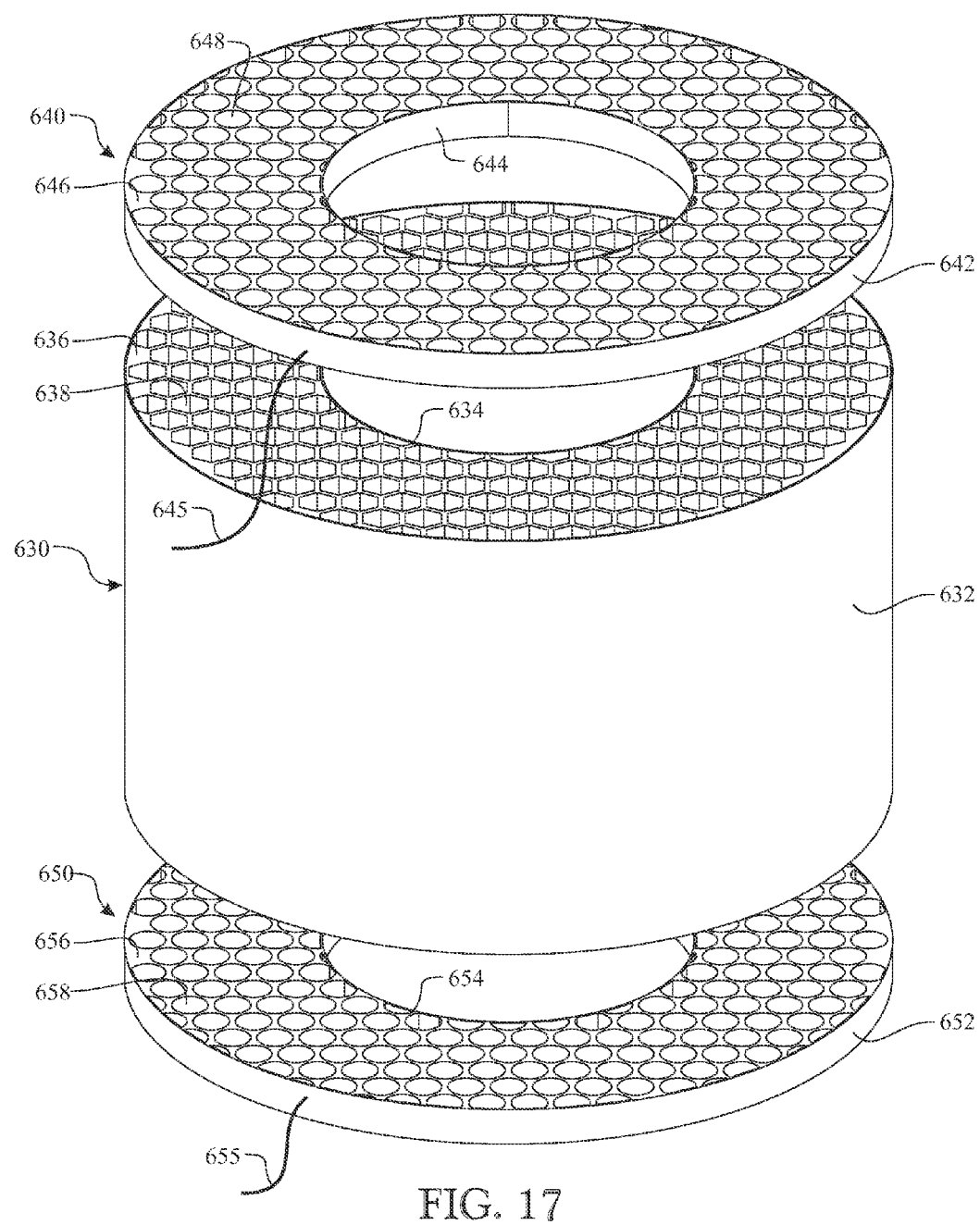
FIG. 17 presents an exploded isometric assembly view of filtration components of the exemplary pass through reclamation assembly introduced in FIG. 16.
Figure 18:
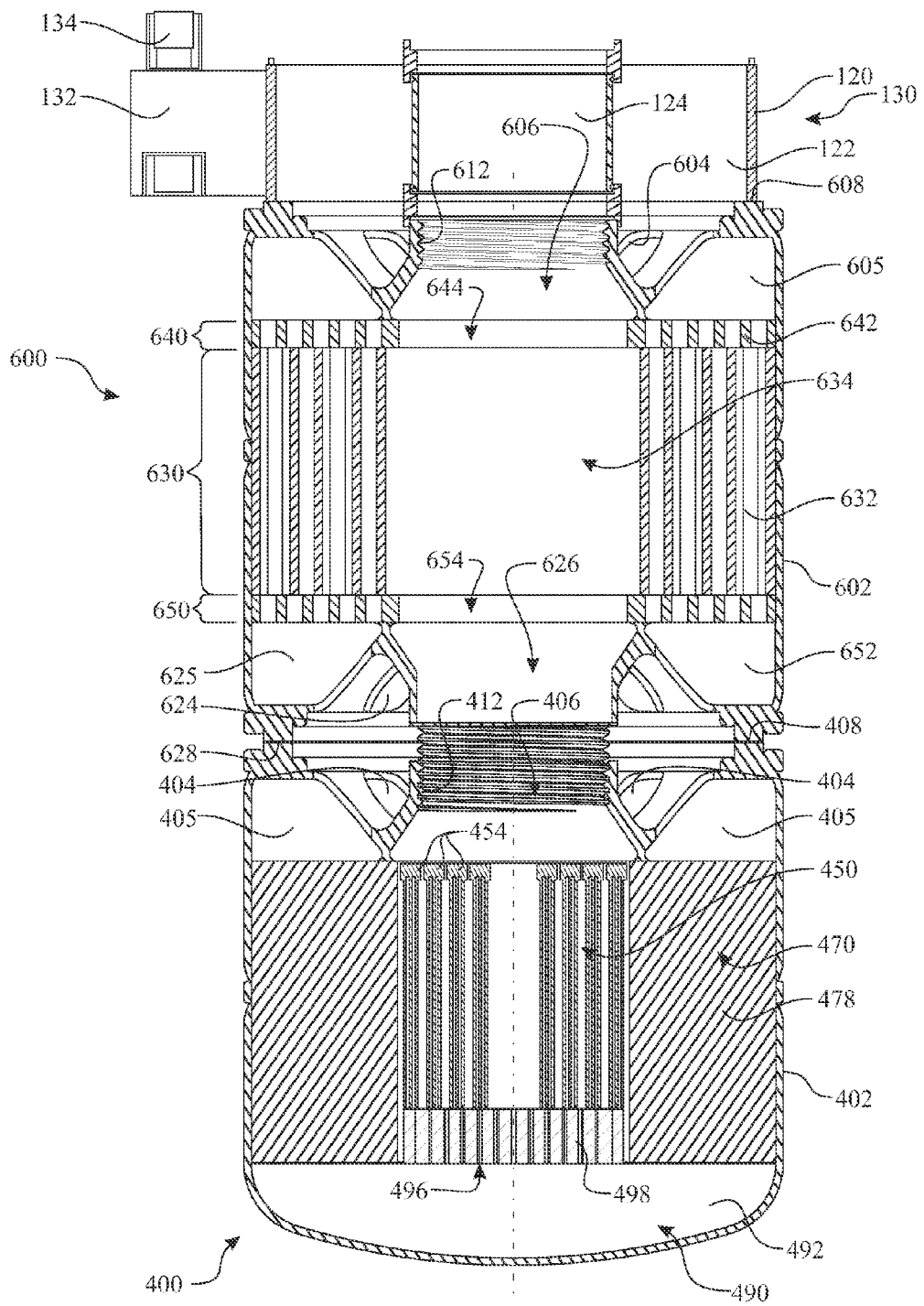
FIG. 18 presents an elevation sectioned view of an exemplary filtration system integrating the exemplary pass through reclamation assembly between an OEM bracket and an OEM or similar enclosed reclamation apparatus.
Figure 19:
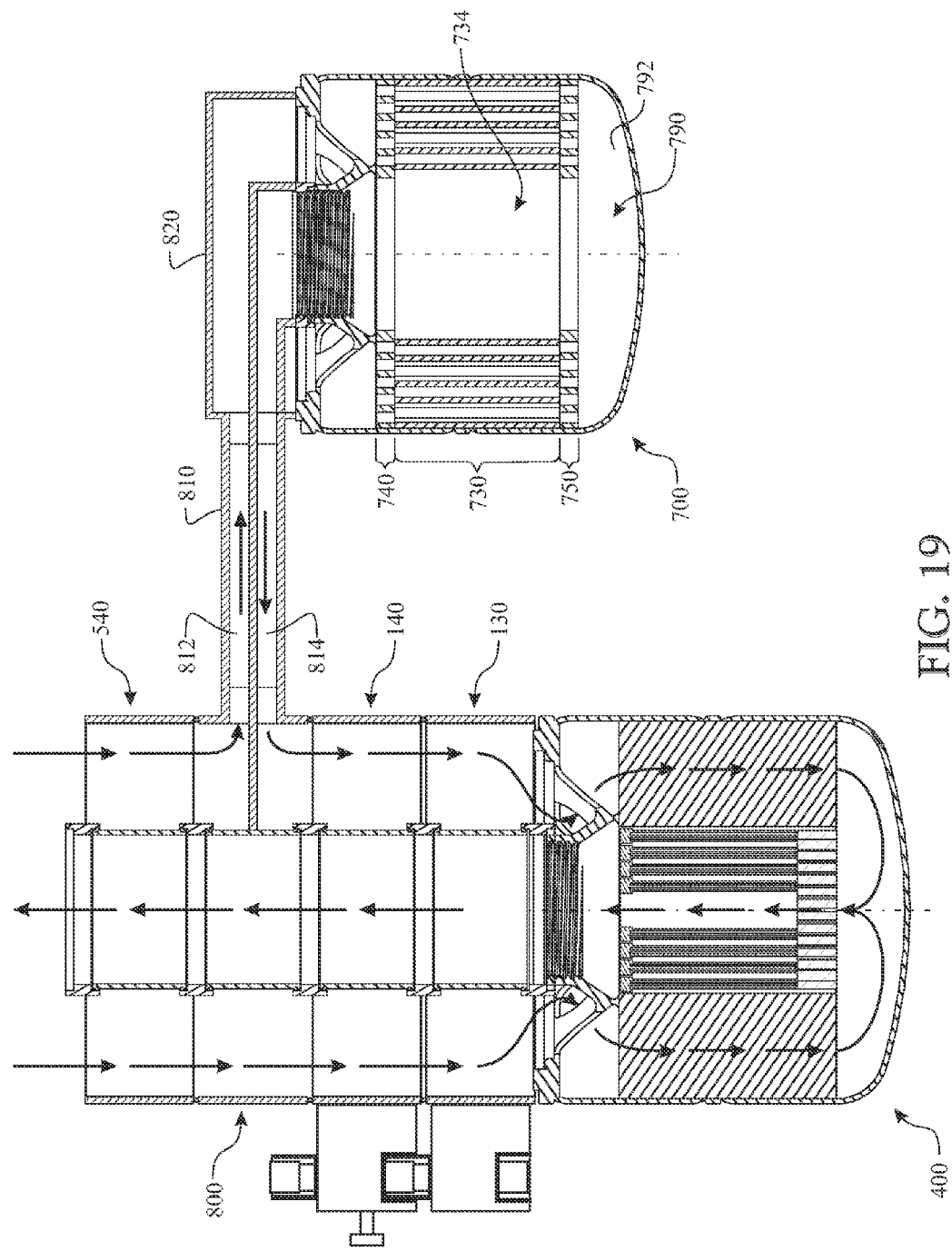
FIG. 19 presents an elevation sectioned view of another exemplary filtration system integrating an alternate exemplary pass through reclamation assembly using a bypass filter bracket to divert and collect lubricant from a bypass reclamation assembly.

A conductive reclamation device may be provided in any form factor, including a pass through configuration, such as a pass through reclamation assembly 600 presented in FIGS. 16 and 18 and a bypass configuration, such as a bypass reclamation assembly 700 presented in FIG. 19. Details of an exemplary additive configuration are presented in FIG. 17.

In replenishing additive in lubrication oil or similar environment, the need to control additive diffusion rate can be achieved via coating a polymer backbone (such as Polypropylene, polyethylene, nafion or composites thereof) incasing additives with a conductive laminar film (such as Zirconium, sulfonation, and the like), grafting or by doping the polymer backbone with a conductive element (ex. iodine, graphite, or graphene). The processes are used to control polymer morphology, swelling, and conductivity.

The goal is to slowly diffuse polar dispersants (additives) or more specifically additive dispersants that form micelle around free-floating (soot) particles. Because these dispersants additive by nature are polarized, having a polar head and (aliphatic) hydrocarbon tail they will be more likely to be attracted to an opposite charge and move away from like charges. The opposite charges and be optimized for various filtration/separation applications. Electrical signals can range from $\mu V$ to kV depending on application. Electrical signal wave-shapes and signal phase can be controlled within the processing array member or through external means.

The pass through reclamation assembly 600 implements these reclamation practices.

The pass through reclamation assembly 600 includes two attachment ends: a bracket attachment end and a filter attachment end. The bracket attachment end includes a bracket mount threading 612 for removably engaging with a mating threaded section of the electrical array member 130, pneumatically operated array member 140, standard OEM bracket 540 or the like. A seal feature 608 is provided about a peripheral mating surface to provide a fluid seal between the pass through reclamation assembly 600 and the electrical array member 130, pneumatically operated array member 140, standard OEM bracket 540 or the like. The pass through reclamation assembly 600 is assembled in registration with the electrical array member 130, pneumatically operated array member 140, standard OEM bracket 540 or the like, wherein the processing lubricant inlet conduits 122 align with a series of lubricant inlet ports 604 and the lubricant return port 606 is aligned in fluid communication with the processing lubricant outlet conduits 124, respectively. As the installer tightens the enclosed reclamation apparatus 400 with the electrical array member 130, the gasket provided between the seal feature 608 and a mating edge of the electrical array member 130, pneumatically operated array member 140, standard OEM bracket 540 or the like is compressed, providing the fluid seal therebetween.

Fluid is received from the series of lubricant inlet ports 604 into a lubricant inlet manifold 605, where the fluid is distributed across an inlet surface of the entry conductive reclamation subassembly 640. The entry conductive reclamation subassembly 640 is fabricated having a conductive reclamation matrix 642, which retains the operational elements therein. The entry conductive reclamation subassembly 640 is located at a first end of an additive delivery subassembly 630. A conductive reclamation form 646 is retained by the conductive reclamation matrix 642, comprising a series of conductive reclamation passages 648 passing therethrough. The conductive reclamation form 646 can be fabricated of any conductive material. Examples include electro-conductive graphite, metals, electro-magnetic materials, and the like. When energized, the material can be used to remove magnetic particulate matter, revise any ionic formations within the fluid, remove ionic contaminants, and the like. The conductive reclamation passages 648 are preferably oriented parallel to a longitudinal axis of the entry conductive reclamation subassembly 640. The conductive reclamation form 646 is fabricated of an electrically conductive material and provided in electrical communication with an electrical power source by an electrically conductive conduit 645, such as wire. The fluid continues through the series of conductive reclamation passages 648 for processing through the additive delivery subassembly 630. A conductive reclamation passage 644 is included concentrically shaped about a central axis, providing a fluid return flow path. The conductive reclamation passage 644 can be void (as illustrated), include additional series of conductive reclamation passages 648, a combination thereof, or include one or more alternate reclamation elements.

The additive delivery subassembly 630 is fabricated having an additive delivery matrix 632, which retains the operational elements therein. An additive form 636 is retained by the additive delivery matrix 632, comprising a series of additive passages 638 passing therethrough. The additive passages 638 are preferably oriented parallel to a longitudinal axis of the additive delivery subassembly 630. The cross sectional shape of the additive passages 638 is preferably hexagonal forming a honeycomb shaped matrix. The additive form 636 may be impregnated with an additive that dissolves into passing fluid over time. The additive may be of any known additive composition. Alternatively, the additive may be inserted into a portion of the additive passages 638. An additive return passage 634 is included concentrically shaped about a central axis, providing a fluid return flow path. The additive return passage 634 can be void (as illustrated), include additional series of additive passages 638, a combination thereof, or include one or more alternate reclamation elements.

Fluid exits from the series of additive passages 638 and continues through the discharge conductive reclamation subassembly 650. The discharge conductive reclamation subassembly 650 is fabricated having a conductive reclamation matrix 652, which retains the operational elements therein. The discharge conductive reclamation subassembly 650 is located at a second end of the additive delivery subassembly 630. A conductive reclamation form 656 is retained by the conductive reclamation matrix 652, comprising a series of conductive reclamation passages 658 passing therethrough. The conductive reclamation passages 658 are preferably oriented parallel to a longitudinal axis of the discharge conductive reclamation subassembly 650. The conductive reclamation form 656 is fabricated of an electrically conductive material and provided in electrical communication with an electrical power source by an electrically conductive conduit 655, such as wire. The fluid continues through the series of conductive reclamation passages 658 and is subsequently transferred to the enclosed reclamation apparatus 400 for further processing. A conductive reclamation passage 654 is included concentrically shaped about a central axis, providing a fluid return flow path. The conductive reclamation passage 654 can be void (as illustrated), include additional series of conductive reclamation passages 658, a combination thereof, or include one or more alternate reclamation elements.

As the treated lubricant exits the series of conductive reclamation passages 658, the lubricant is collected within a lubricant collection manifold 625. The lubricant collection manifold 625 redirects the fluid through a series of lubricant discharge ports 624 for transfer to the enclosed reclamation apparatus 400.

It is desired that the entry conductive reclamation subassembly 640 and discharge conductive reclamation subassembly 650 have opposite charges. Using this principle, a two-part incasing such as the one reserving the additive inside can be charged on a first side with a negative charge and oppositely charged on the other side with a positive charge causing the push/pull force on the additives within slowly diffusing the additive through the polymer matrix until it reaches the outside surface where it will be washed away or mixed with the passing fluid, such as a lubricant.

The enclosed reclamation apparatus 400 is assembled to the pass through reclamation assembly 600 in a manner similar to the method of assembly between the pass through reclamation assembly 600 and the electrical array member 130, pneumatically operated array member 140, standard OEM bracket 540, and the like. A seal feature 628 is provided about a peripheral edge of the filter attachment side of the pass through reclamation assembly 600. The seal feature 628 mates with the seal feature 408 providing a fluid seal therebetween. A threaded attachment member 622 extends along a longitudinal axis of the pass through reclamation housing 602 providing an attachment element for rotationally engaging with the filter mount threading 412 of the enclosed reclamation apparatus 400. The enclosed reclamation apparatus 400 is assembled in registration with the pass through reclamation assembly 600, wherein the lubricant inlet ports 404 aligns with a series of lubricant discharge ports 624 and the lubricant outlet port 406 is aligned in fluid communication with a lubricant return port 626, respectively. As the installer tightens the enclosed reclamation apparatus 400 with the pass through reclamation assembly 600, the gasket provided between the seal feature 408 and the seal feature 628 is compressed, providing the fluid seal therebetween.

The exemplary configuration enables fluid (more specifically a lubricant) to enter and be treated by the pass through reclamation assembly 600, pass into the enclosed reclamation apparatus 400, and return to the system for use. In an alternate embodiment, the flow path utilizes a bypass filter bracket 800 to divert the flow of the fluid into a bypass reclamation assembly 700. Details of the functional elements of the bypass reclamation assembly 700 are not identified in FIG. 19 for clarify, wherein the bypass reclamation assembly 700 comprises functional elements similar to those of the pass through reclamation assembly 600 and are referred to as such.

The bypass filter bracket 800 is configured to be adapted to the standard OEM bracket 540, the electrical array member 130, the pneumatically operated array member 140, or the like. The bypass filter bracket 800 includes a bypass filter conduit assembly 810, which diverts fluid from the general flow path between the standard OEM bracket 540 and the enclosed reclamation apparatus 400 into the bypass reclamation assembly 700. The exemplary embodiment presents the diverting flow path being prior to entry into the enclosed reclamation apparatus 400. It is understood that the flow path created by the bypass filter bracket 800 may be configured to divert the fluid during the return portion of the flow path.

The bypass filter conduit assembly 810 comprises a bypass filter supply conduit 812 and a bypass filter return conduit 814. The bypass filter supply conduit 812 and bypass filter return conduit 814 may be integrated into a single unit or separate, such as via two hoses. The bypass filter supply conduit 812 and bypass filter return conduit 814 provide fluid communication between the bypass filter bracket 800 and an bypass filter mounting bracket 820. The bypass reclamation assembly 700 is removeably attached to the bypass filter mounting bracket 820. The bypass reclamation assembly 700 is a modified configuration of the pass through reclamation assembly 600, providing the same functionality as the pass through reclamation assembly 600, while instead of routing the fluid in a single direction, the bypass reclamation assembly 700 returns the fluid to the same side thereof. Where opposite end of the pass through reclamation assembly 600 comprises a fluid communication interface, which engages with the enclosed reclamation apparatus 400, the bypass reclamation assembly 700 comprises a base filtering section 790, which redirects the fluid back towards the bypass filter mounting bracket 820. The base filtering section 790 may be void or include a base filtering material 792 to enhance the reclamation process. The fluid passes through an entry conductive reclamation subassembly 740, obtains an additive when passing through an additive delivery subassembly 730, and continues being processed as it passes through a discharge conductive reclamation subassembly 750. The fluid is then diverted by the base filtering section 790, and returns through the additive return passage 734. The conductive reclamation subassemblies 740, 750 are energized by an electrical source. The quality of the fluid can be monitored, wherein an analysis can determine if or when to apply electrical power to the conductive reclamation subassemblies 740, 750.

It is understood that the reclamation assemblies 600, 700 can include one or both of the entry conductive reclamation subassembly 640, 740 and discharge conductive reclamation subassembly 650, 750. The conductive reclamation subassemblies 640, 650, 740, 750. The conductive assemblies can be charged in a wave pattern or frequency. The wave pattern can be controlled by an embedded or a remotely located processor. The processing algorithm can optionally utilize sensor provided data to optimize the transmitted signal.

Figure 20:
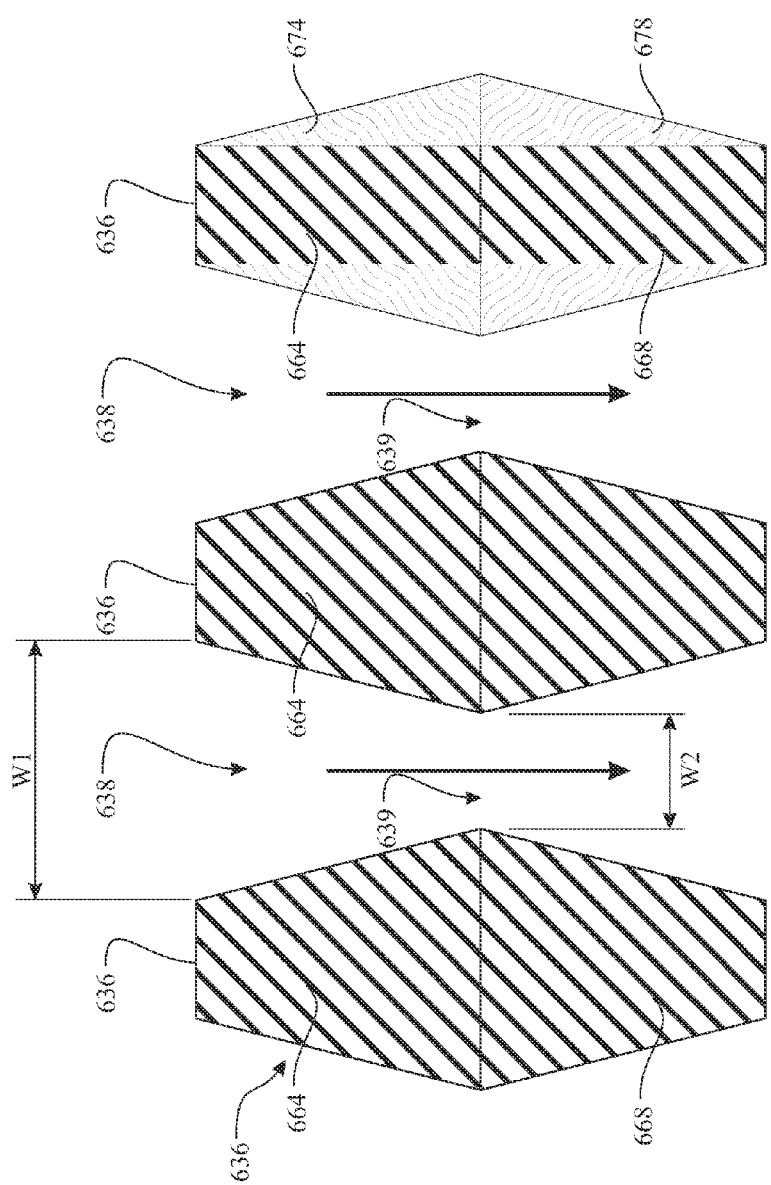
FIG. 20 presents a detailed section side view of a portion of the additive delivery matrix 632.

The additive passages 638 may be linear or shaped along a length thereof. One exemplary shaping is illustrated in FIG. 20. An additive passage venturi 639 may be formed within the additive passages 638 by reducing the width of the additive passages 638. The additive passages 638 have an initial cross sectional area, which can be defined having an effective width W1. The cross sectional area is reduced to an effective width W2 causing a venturi effect. According to the laws governing fluid dynamics, a fluid's velocity must increase as it passes through a constriction to satisfy the principle of continuity, while its pressure must decrease to satisfy the principle of conservation of mechanical energy. Thus any gain in kinetic energy a fluid may accrue due to its increased velocity through a constriction is negated by a drop in pressure. The narrowed cross section can be fabricated using a molding process, a laminating process, and the like. In the exemplary embodiment, the additive form 636 is fabricated in multiple sections, having a first additive form section 664 laminated to a second additive form section 668. Alternately the additive form 636 may be fabricated using a first form to shape the first additive form section 664 and a second form to shape the second additive form section 668. In another embodiment, the additive 674, 678 may be utilized in the formation of the additive form 636 to create the venturi.

As previously described, the various subassemblies, such as the standard OEM bracket 540, the electrical array member 130, the pneumatically operated array member 140, the bypass filter bracket 800, the enclosed reclamation apparatus 100, the enclosed reclamation apparatus 400, the pass through reclamation assembly 600, the bypass reclamation assembly 700, and the like can be used in any reasonable configuration. Each of the components is preferably designed to be adapted onto any existing OEM equipment.

It is understood that the operational elements of the pass through reclamation assembly 600, including the entry conductive reclamation subassembly 640 and or the discharge conductive reclamation subassembly 650 in conjunction with the additive delivery subassembly 630 may be integrated into the electrical array member 130. Similarly, the pass through reclamation assembly 600 and or combination of the bypass reclamation assembly 700 and bypass filter bracket 800 can be employed with any of the other embodiments disclosed within co-pending applications U.S. patent application Ser. No. 12/732,126, filed on Mar. 25, 2010, U.S. patent application Ser. No. 12/796,652, filed on Jun. 8, 2010, and co-pending U.S. patent application Ser. No. 13/108,930 filed on May 16, 2011, all of which are incorporated in their entireties herein by reference.

The various filtration materials can be designed to control the flow direction, volume, and rates by utilizing specific materials having differing permeability's. Additionally, the filter 100 provides simple customization via changes in the selected filtration materials. The filter fabricator would select the various components to match a desired filtration application and assemble accordingly.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. An oil reclamation system, the system comprising:
a fluid reclamation housing providing an exterior shell and an interfacing surface defining a housing interior;
an inlet port for transferring a fluid into the fluid reclamation housing from a lubrication system;
a return port for transferring fluid from the fluid reclamation housing to the lubrication system;
a first conductive reclamation subassembly comprising a first conductive reclamation matrix having a series of conductive reclamation passages passing therethrough enabling transfer of the fluid therethrough, the first conductive reclamation matrix being contained within the housing interior;
an electrical conduit in electrical communication with the conductive reclamation subassembly, providing electrical power thereto;
an additive delivery subassembly comprising an additive form having a plurality of additive passages passing therethrough enabling transfer of a fluid therethrough, the additive delivery subassembly being contained within the housing interior;

an additive being embedded within the additive delivery subassembly in a manner enabling dissolution of the additive as the fluid passes through the plurality of additive passages; and a return passage provided through each of the conductive reclamation matrix and the additive delivery subassembly, wherein the return passage is configured to provide a flow path for returning the fluid to a lubrication system for use.

2. An oil reclamation system as recited in claim 1, wherein the return passage is centrally located through each of the conductive reclamation matrix and the additive delivery subassembly.

3. An oil reclamation system as recited in claim 1, the additive passages are formed having a honeycomb cross sectional shape.

4. An oil reclamation system as recited in claim 1, the additive passages further comprise a change in cross sectional area, wherein at least a portion of the additive passages comprise an initial cross sectional area at an entry region of the additive passage and a second cross sectional area located at a distance from the entry region within the additive passage, wherein the second cross sectional area is smaller than the initial cross sectional area creating a venturi.

5. An oil reclamation system as recited in claim 1, the oil reclamation system further comprising a second conductive reclamation subassembly comprising a second conductive reclamation matrix having a second series of conductive reclamation passages passing therethrough enabling transfer of the fluid therethrough, the second conductive reclamation matrix being contained within the housing interior, wherein the first conductive reclamation subassembly is located proximate a first end of the additive delivery subassembly and the second conductive reclamation subassembly is located proximate a second end of the additive delivery subassembly.

6. An oil reclamation system as recited in claim 1, the additive passages further comprise a filtration medium disposed therein.

7. An oil reclamation system, the system comprising:
a fluid reclamation housing providing an exterior shell and an interfacing surface defining a housing interior;
an inlet port for transferring a fluid into the fluid reclamation housing from a lubrication system, the inlet port located at a first end of the fluid reclamation housing;
a return port for transferring fluid from the fluid reclamation housing to the lubrication system, the return port located at the first end of the fluid reclamation housing;
a base filtering section for redirecting fluid flowing from the inlet port towards the return port;
a first conductive reclamation subassembly comprising a first conductive reclamation matrix having a series of conductive reclamation passages passing therethrough enabling transfer of the fluid therethrough, the first conductive reclamation matrix being contained within the housing interior;
an electrical conduit in electrical communication with the conductive reclamation subassembly, providing electrical power thereto;
an additive delivery subassembly comprising an additive form having a plurality of additive passages passing therethrough enabling transfer of a fluid therethrough, the additive delivery subassembly being contained within the housing interior; and an additive being embedded within the additive delivery subassembly in a manner enabling dissolution of the additive as the fluid passes through the plurality of additive passages.

8. An oil reclamation system as recited in claim 7, the system further comprising a return passage provided through each of the conductive reclamation matrix and the additive delivery subassembly, wherein the return passage is configured to provide a flow path for returning the fluid to a lubrication system for use.

9. An oil reclamation system as recited in claim 7, the system further comprising a return passage centrally located through each of the conductive reclamation matrix and the additive delivery subassembly, wherein the return passage is configured to provide a flow path for returning the fluid to a lubrication system for use.

10. An oil reclamation system as recited in claim 7, the additive passages are formed having a honeycomb cross sectional shape.

11. An oil reclamation system as recited in claim 7, the additive passages further comprise a change in cross sectional area, wherein at least a portion of the additive passages comprise an initial cross sectional area at an entry region of the additive passage and a second cross sectional area located at a distance from the entry region within the additive passage, wherein the second cross sectional area is smaller than the initial cross sectional area creating a venturi.

12. An oil reclamation system as recited in claim 7, the oil reclamation system further comprising a second conductive reclamation subassembly comprising a second conductive reclamation matrix having a second series of conductive reclamation passages passing therethrough enabling transfer of the fluid therethrough, the second conductive reclamation matrix being contained within the housing interior, wherein the first conductive reclamation subassembly is located proximate a first end of the additive delivery subassembly and the second conductive reclamation subassembly is located proximate a second end of the additive delivery subassembly.

13. An oil reclamation system as recited in claim 7, the additive passages further comprise a filtration medium disposed therein.

14. An oil reclamation system, the system comprising:
a fluid reclamation housing providing an exterior shell and an interfacing surface defining a housing interior;
an inlet port for transferring a fluid into the fluid reclamation housing from a lubrication system, the inlet port located at a first end of the fluid reclamation housing;
a discharge port for transferring fluid from the fluid reclamation housing to a filter in fluid communication with the second end of the fluid reclamation housing, the discharge port located at a second end of the fluid reclamation housing;
a filter fluid return port for transferring fluid from the filter to the fluid reclamation housing, the filter return port located at the second end of the fluid reclamation housing;
a system fluid return port for transferring fluid from the fluid reclamation housing to the lubrication system, the system fluid return port located at the first end of the fluid reclamation housing;
a first conductive reclamation subassembly comprising a first conductive reclamation matrix having a series of conductive reclamation passages passing therethrough enabling transfer of the fluid therethrough, the first conductive reclamation matrix being contained within the housing interior;

an electrical conduit in electrical communication with the conductive reclamation subassembly, providing electrical power thereto;

an additive delivery subassembly comprising an additive form having a plurality of additive passages passing therethrough enabling transfer of a fluid therethrough, the additive delivery subassembly being contained within the housing interior; and an additive being embedded within the additive delivery subassembly in a manner enabling dissolution of the additive as the fluid passes through the plurality of additive passages.

15. An oil reclamation system as recited in claim 14, the system further comprising a return passage provided through each of the conductive reclamation matrix and the additive delivery subassembly, wherein the return passage is configured to provide a flow path for returning the fluid to a lubrication system for use.

16. An oil reclamation system as recited in claim 14, the system further comprising a return passage centrally located through each of the conductive reclamation matrix and the additive delivery subassembly, wherein the return passage is configured to provide a flow path for returning the fluid to a lubrication system for use.

17. An oil reclamation system as recited in claim 14, the additive passages are formed having a honeycomb cross sectional shape.

18. An oil reclamation system as recited in claim 14, the additive passages further comprise a change in cross sectional area, wherein at least a portion of the additive passages comprise an initial cross sectional area at an entry region of the additive passage and a second cross sectional area located at a distance from the entry region within the additive passage, wherein the second cross sectional area is smaller than the initial cross sectional area creating a venturi.

19. An oil reclamation system as recited in claim 14, the oil reclamation system further comprising a second conductive reclamation subassembly comprising a second conductive reclamation matrix having a second series of conductive reclamation passages passing therethrough enabling transfer of the fluid therethrough, the second conductive reclamation matrix being contained within the housing interior, wherein the first conductive reclamation subassembly is located proximate a first end of the additive delivery subassembly and the second conductive reclamation subassembly is located proximate a second end of the additive delivery subassembly.

* * * * *